| (12) | United States Patent<br>Tayyab et al. | (10) Patent No.: US 12,283,984 B2<br>(45) Date of Patent: Apr. 22, 2025 |

(54) COMPENSATING FOR MISSED POSITIONING REFERENCE SIGNALS

(71) Applicant: Nokia Solutions and Networks Oy, Espoo (FI)

(72) Inventors: Muhammad Tayyab, Oulu (FI); Satya Krishna Joshi, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/821,326

(22) Filed: Aug. 30, 2024

(65) Prior Publication Data

US 2025/0080160 A1 Mar. 6, 2025

(30) Foreign Application Priority Data

Aug. 30, 2023 (FI) .................................... 20235966

(51) Int. Cl.
| | |
|---|---|
| *H04B 1/7156* | (2011.01) |
| *H04B 17/318* | (2015.01) |
| *H04B 17/364* | (2015.01) |
| *H04L 5/00* | (2006.01) |
| *H04L 25/02* | (2006.01) |

(52) U.S. Cl.
CPC ......... *H04B 1/7156* (2013.01); *H04B 17/328* (2023.05); *H04B 17/364* (2015.01); *H04L 5/0048* (2013.01); *H04L 25/0212* (2013.01); *H04B 2001/71566* (2013.01)

(58) Field of Classification Search
CPC .. H04B 1/7156; H04B 17/328; H04B 17/364; H04B 2001/71566; H04L 5/0048; H04L 25/0212

USPC ......................................................... 375/133
See application file for complete search history.

(56) References Cited

U.S. PATENT DOCUMENTS

| | | | |
|---|---|---|---|
| 2022/0029763 A1* | 1/2022 | Manolakos | ........... H04L 5/0091 |
| 2022/0109466 A1 | 4/2022 | Manolakos et al. | |
| 2022/0187411 A1* | 6/2022 | Manolakos | ....... H04W 72/0453 |

FOREIGN PATENT DOCUMENTS

| | | |
|---|---|---|
| WO | 2022/071989 A1 | 4/2022 |
| WO | 2022/073171 A1 | 4/2022 |
| WO | 2023/014566 A1 | 2/2023 |
| WO | 2023/014795 A1 | 2/2023 |
| WO | 2023/055631 A1 | 4/2023 |

(Continued)

OTHER PUBLICATIONS

"3rd Generation Partnership Project; Technical Specification Group Radio Access Network; NR; Medium Access Control (MAC) protocol specification (Release 17)", 3GPP TS 38.321, V17.3.0, Dec. 2022, pp. 1-251.

(Continued)

*Primary Examiner* — Fitwi Y Hailegiorgis
(74) *Attorney, Agent, or Firm* — Nokia Technologies Oy

(57) ABSTRACT

Disclosed is a method comprising receiving, from a user equipment, information indicating at least: one or more channel characteristics of one or more received positioning reference signals of a set of frequency hops, and one or more identifiers of one or more missed positioning reference signals of the set of frequency hops; and compensating for the one or more missed positioning reference signals of the set of frequency hops based at least partly on the information.

18 Claims, 11 Drawing Sheets

(56) References Cited

FOREIGN PATENT DOCUMENTS

WO 2024/099897 A1 5/2024

OTHER PUBLICATIONS

"3rd Generation Partnership Project; Technical Specification Group Radio Access Network; NR; Radio Resource Control (RRC) protocol specification (Release 17)", 3GPP TS 38.331, V17.3.0, Dec. 2022, pp. 1-1318.
"3rd Generation Partnership Project; Technical Specification Group Radio Access Network; Study on support of reduced capability NR devices (Release 17)", 3GPP TR 38.875, V17.0.0, Mar. 2021, pp. 1-135.
"3rd Generation Partnership Project; Technical Specification Group Radio Access Network; Study on further NR RedCap UE complexity reduction (Release 18)", 3GPP TR 38.865, V18.0.0, Sep. 2022, pp. 1-52.
PCT Application No. PCT/EP2023/080662, "Positioning with Discontinuous Reception", filed on Nov. 3, 2023, pp. 1-40.
Finnish Application No. 20235158, "Positioning with Discontinuous Reception", filed on Feb. 15, 2023, pp. 1-30.
Moloudi et al., "Coverage Evaluation for 5G Reduced Capability New Radio (NR-RedCap)", IEEE Access, vol. 9, Mar. 15, 2021, pp. 45055-45067.
"What is reduced capability (RedCap) NR and what will it achieve?", Ericsson, Retrieved on Feb. 27, 2024, Webpage available at : https://www.ericsson.com/en/blog/2021/2/reduced-cap-nr.
Dian et al., "Wearables and the Internet of Things (IoT), Applications, Opportunities, and Challenges: A Survey", IEEE Access, vol. 8, Apr. 7, 2020, pp. 69200-69211.
"New WID on enhanced support of reduced capability NR devices", 3GPP TSG RAN Meeting #97-e, RP-222675, Agenda: 9.1.1, Ericsson, Sep. 12-16, 2022, 5 pages.
"3rd Generation Partnership Project; Technical Specification Group Radio Access Network; NR; Physical channels and modulation (Release 17)", 3GPP TS 38.211, V17.4.0, Dec. 2022, pp. 1-136.
"Discussion on RedCap positioning", 3GPP TSG-RAN WG1 Meeting #110bis-e, R1-2208457, Agenda: 9.5.3, Huawei, Oct. 10-19, 2022, 14 pages.
"RAN1 Chair's Notes", 3GPP TSG RAN WG1 #110, Aug. 22-26, 2022, 52 pages.
"Discussion on RedCap Positioning", 3GPP TSG-RAN WG2 #119bis-e, R2-2209643, Agenda: 8.2.5, Huawei, Oct. 10-19, 2022, pp. 1-4.
"Views on Rel-17 positioning latency reduction", 3GPP TSG RAN WG1 #106-e, R1-2107743, Agenda: 8.5.4, Apple Inc, Aug. 16-27, 2021, pp. 1-4.
"IEEE 802.11", Wikipedia, Retrieved on Dec. 1, 2023, Webpage available at : https://en.wikipedia.org/wiki/IEEE_802.11.
"IEEE 802.15", Wikipedia, Retrieved on Dec. 11, 2023, Webpage available at : https://en.wikipedia.org/wiki/IEEE_802.15.
Office action received for corresponding Finnish Patent Application 20235966, dated Feb. 16, 2024, 7 pages.
"Discussion on positioning for RedCap UEs", 3GPP TSG RAN WG1 #112bis-e, R1-2302496, Agenda: 9.5.5, vivo, Apr. 17-26, 2023, 18 pages.
Extended European Search Report received for corresponding European Patent Application No. 24194709.2, dated Feb. 7, 2025, 11 pages.
"Views on Positioning for RedCap UEs", 3GPP TSG RAN WG1 #113, R1-2305180, Agenda: 9.5.5, Nokia, May 22-26, 2023, 8 pages.

\* cited by examiner

COMPENSATING FOR MISSED POSITIONING REFERENCE SIGNALS

RELATED APPLICATION

This application claims priority to Finnish Patent Application No. 20235966, filed Aug. 30, 2023, which is incorporated herein by reference in its entirety.

FIELD

The following example embodiments relate to wireless communication and to positioning.

BACKGROUND

Positioning is a process that may be used to estimate a position of a device. It is desirable to improve the positioning accuracy in order to estimate the position of the device more accurately.

SUMMARY

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: receive, from a user equipment, information indicating at least: one or more channel characteristics of one or more received positioning reference signals of a set of frequency hops, and one or more identifiers of one or more missed positioning reference signals of the set of frequency hops; and compensate for the one or more missed positioning reference signals of the set of frequency hops based at least partly on the information.

According to another aspect, there is provided an apparatus comprising: means for receiving, from a user equipment, information indicating at least: one or more channel characteristics of one or more received positioning reference signals of a set of frequency hops, and one or more identifiers of one or more missed positioning reference signals of the set of frequency hops; and means for compensating for the one or more missed positioning reference signals of the set of frequency hops based at least partly on the information.

According to another aspect, there is provided a method comprising: receiving, from a user equipment, information indicating at least: one or more channel characteristics of one or more received positioning reference signals of a set of frequency hops, and one or more identifiers of one or more missed positioning reference signals of the set of frequency hops; and compensating for the one or more missed positioning reference signals of the set of frequency hops based at least partly on the information.

According to another aspect, there is provided a computer program comprising instructions which, when executed by an apparatus, cause the apparatus to perform at least the following: receiving, from a user equipment, information indicating at least: one or more channel characteristics of one or more received positioning reference signals of a set of frequency hops, and one or more identifiers of one or more missed positioning reference signals of the set of frequency hops; and compensating for the one or more missed positioning reference signals of the set of frequency hops based at least partly on the information.

According to another aspect, there is provided a computer readable medium comprising program instructions which, when executed by an apparatus, cause the apparatus to perform at least the following: receiving, from a user equipment, information indicating at least: one or more channel characteristics of one or more received positioning reference signals of a set of frequency hops, and one or more identifiers of one or more missed positioning reference signals of the set of frequency hops; and compensating for the one or more missed positioning reference signals of the set of frequency hops based at least partly on the information.

According to another aspect, there is provided a non-transitory computer readable medium comprising program instructions which, when executed by an apparatus, cause the apparatus to perform at least the following: receiving, from a user equipment, information indicating at least: one or more channel characteristics of one or more received positioning reference signals of a set of frequency hops, and one or more identifiers of one or more missed positioning reference signals of the set of frequency hops; and compensating for the one or more missed positioning reference signals of the set of frequency hops based at least partly on the information.

According to another aspect, there is provided an apparatus comprising at least one processor, and at least one memory storing instructions that, when executed by the at least one processor, cause the apparatus at least to: determine one or more identifiers of one or more missed positioning reference signals of a set of frequency hops; and transmit, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided an apparatus comprising: means for determining one or more identifiers of one or more missed positioning reference signals of a set of frequency hops; and means for transmitting, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided a method comprising: determining one or more identifiers of one or more missed positioning reference signals of a set of frequency hops; and transmitting, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided a computer program comprising instructions which, when executed by an apparatus, cause the apparatus to perform at least the following: determining one or more identifiers of one or more missed positioning reference signals of a set of frequency hops; and transmitting, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided a computer readable medium comprising program instructions which, when executed by an apparatus, cause the apparatus to perform at least the following: determining one or more identifiers of one or more missed positioning reference signals of a set of frequency hops; and transmitting, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided a non-transitory computer readable medium comprising program instructions which, when executed by an apparatus, cause the apparatus to perform at least the following: determining one or more identifiers of one or more missed positioning reference signals of a set of frequency hops; and transmitting, to a location management entity, information indicating at least: one or more channel characteristics of one or more received positioning reference signals of the set of frequency hops, and the one or more identifiers of the one or more missed positioning reference signals of the set of frequency hops.

According to another aspect, there is provided a system comprising at least a user equipment and a location management entity. The user equipment is configured to: determine one or more identifiers of one or more missed positioning reference signals of a set of frequency hops; and transmit, to the location management entity, information indicating at least: one or more channel characteristics of one or more received positioning reference signals of the set of frequency hops, and the one or more identifiers of the one or more missed positioning reference signals of the set of frequency hops. The location management entity is configured to: receive the information from the user equipment; and compensate for the one or more missed positioning reference signals of the set of frequency hops based at least partly on the information.

According to another aspect, there is provided a system comprising at least a user equipment and a location management entity. The user equipment comprises: means for determining one or more identifiers of one or more missed positioning reference signals of a set of frequency hops; and means for transmitting, to the location management entity, information indicating at least: one or more channel characteristics of one or more received positioning reference signals of the set of frequency hops, and the one or more identifiers of the one or more missed positioning reference signals of the set of frequency hops. The location management entity comprises: means for receiving the information from the user equipment; and means for compensating for the one or more missed positioning reference signals of the set of frequency hops based at least partly on the information.

BRIEF DESCRIPTION OF THE DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Some example embodiments described herein may be implemented in a wireless communication network comprising a radio access network based on one or more of the following radio access technologies (RATs): Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on IEEE 802.11 specifications, or a communication system based on IEEE 802.15 specifications. IEEE is an abbreviation for the Institute of Electrical and Electronics Engineers.

Figure 1:
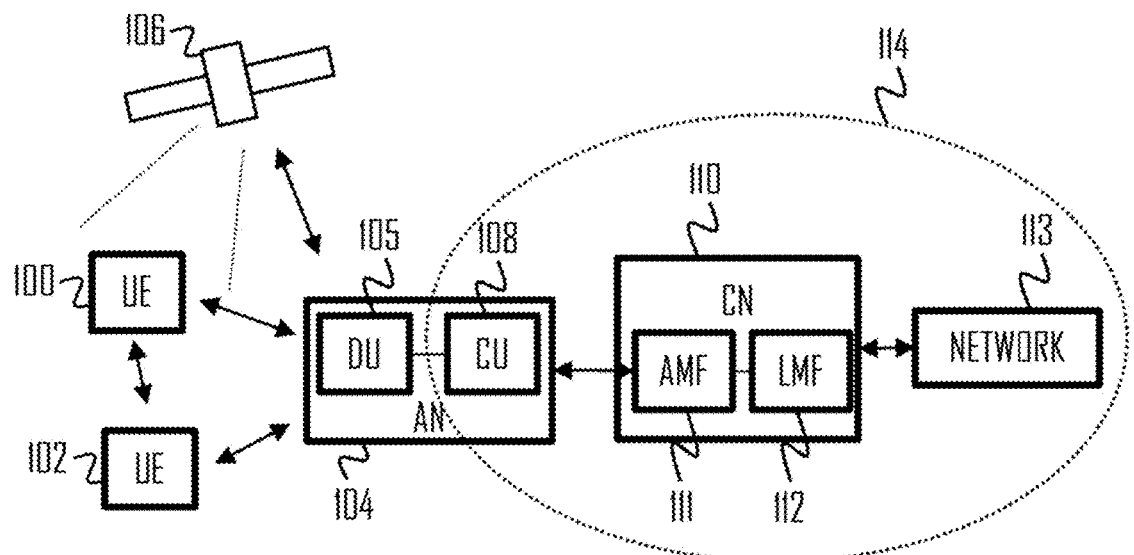
FIG. 1 illustrates an example of a wireless communication network.

FIG. 1 depicts an example of a simplified wireless communication network showing some physical and logical entities. The connections shown in FIG. 1 may be physical connections or logical connections. It is apparent to a person skilled in the art that the wireless communication network may also comprise other physical and logical entities than those shown in FIG. 1.

The example embodiments described herein are not, however, restricted to the wireless communication network given as an example but a person skilled in the art may apply the embodiments described herein to other wireless communication networks provided with necessary properties.

The example wireless communication network shown in FIG. 1 includes an access network, such as a radio access network (RAN), and a core network 110.

FIG. 1 shows user equipment (UE) 100, 102 configured to be in a wireless connection on one or more communication channels in a radio cell with an access node (AN) 104 of an access network. The AN 104 may be an evolved NodeB (abbreviated as eNB or eNodeB), or a next generation evolved NodeB (abbreviated as ng-eNB), or a next generation NodeB (abbreviated as gNB or gNodeB), providing the radio cell. The wireless connection (e.g., radio link) from a UE to the access node 104 may be called uplink (UL) or reverse link, and the wireless connection (e.g., radio link) from the access node to the UE may be called downlink (DL) or forward link. UE 100 may also communicate directly with UE 102, and vice versa, via a wireless connection generally referred to as a sidelink (SL). It should be appreciated that the access node 104 or its functionalities may be implemented by using any node, host, server or access point etc. entity suitable for providing such functionalities.

The access network may comprise more than one access node, in which case the access nodes may also be configured to communicate with one another over links, wired or wireless. These links between access nodes may be used for sending and receiving control plane signaling and also for routing data from one access node to another access node.

The access node may comprise a computing device configured to control the radio resources of the access node. The access node may also be referred to as a base station, a base transceiver station (BTS), an access point, a cell site, a radio access node or any other type of node capable of being in a wireless connection with a UE (e.g., UEs 100, 102). The access node may include or be coupled to transceivers. From the transceivers of the access node, a connection may be provided to an antenna unit that establishes bi-directional radio links to UEs 100, 102. The antenna unit may comprise an antenna or antenna element, or a plurality of antennas or antenna elements.

The access node 104 may further be connected to a core network (CN) 110. The core network 110 may comprise an evolved packet core (EPC) network and/or a $5^{th}$ generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise network functions, such as a user plane function (UPF), an access and mobility management function (AMF) 111, and a location management function (LMF) 112.

With respect to positioning, the core network 110 may comprise a 5GC having a service-based architecture. The 5GC may comprise various network functions, including an AMF 111 and an LMF 112. The AMF 111 may be configured to provide location information for call processing, mobility policy enforcement, and charging purposes to other network functions in the core network 110 and to other entities requesting for positioning of UEs 100, 102. The AMF 111 may receive and manage location requests from several entities: mobile-originated location requests (MO-LR) received from the UEs 100, 102 and mobile-terminated location requests (MT-LR) destined for other functions of the core network or the access network. The AMF 111 may select the LMF 112 for a given request and use its positioning service to trigger a positioning session. The LMF 112 may then carry out the positioning upon receiving such a request from the AMF 111. The LMF 112 may manage the resources and timing of positioning activities. The LMF 112 may obtain location information for a UE 100, 102 with at least one of the following ways: by sending a Namf_Communication service request via the NL1 interface to one or more access nodes for network-based positioning; or by communicating with the UE over the N1 interface for UE-based or UE-assisted positioning. The location information obtained by the LMF 112 may include an estimation of the location of the UE 100, 102 and, additionally, the LMF 112 may also estimate movement or accuracy of the location information when requested. Connection-wise, the AMF 111 may be between the access node 104 and the LMF 112 and, thus, closer to the access nodes than the LMF.

The core network 110 may also be able to communicate with one or more external networks 113, such as a public switched telephone network or the Internet, or utilize services provided by them. For example, in 5G wireless communication networks, the UPF of the core network 110 may be configured to communicate with an external data network via an N6 interface. In LTE wireless communication networks, the P-GW of the core network 110 may be configured to communicate with an external data network.

The illustrated UE 100, 102 is one type of an apparatus to which resources on the air interface may be allocated and assigned. The UE 100, 102 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

Any feature described herein with a UE may also be implemented with a corresponding apparatus, such as a relay node. An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and UE(s), and/or between the IAB node and other IAB nodes (multi-hop scenario).

Another example of such a relay node may be a layer 1 relay called a repeater. The repeater may amplify a signal received from an access node and forward it to a UE, and/or amplify a signal received from the UE and forward it to the access node.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 1 by "cloud" 114). The wireless communication network may also comprise a central control entity, or the like, providing facilities for wireless communication networks of different operators to cooperate for example in spectrum sharing.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

5G enables using multiple input-multiple output (MIMO) antennas in the access node 104 and/or the UE 100, 102, many more base stations or access nodes than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, access nodes and/or UEs may have multiple radio interfaces, namely below 6 GHz, cmWave and mmWave, and also being integrable with existing legacy radio access technologies, such as the LTE. Integration with the LTE may be implemented, for example, as a system, where macro coverage may be provided by the LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

5G may enable analytics and knowledge generation to occur at the source of the data. This approach may involve leveraging resources that may not be continuously connected to a network, such as laptops, smartphones, tablets and sensors. Multi-access edge computing (MEC) may provide a distributed computing environment for application and service hosting. It may also have the ability to store and process content in close proximity to cellular subscribers for faster response time. Edge computing may cover a wide range of technologies, such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

In some example embodiments, an access node (e.g., access node 104) may comprise: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such an embodiment of the access node may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be a logical node hosting radio resource control (RRC), service data adaptation protocol (SDAP) and/or packet data convergence protocol (PDCP), of the NR protocol stack for an access node. The DU 105 may be a logical node hosting radio link control (RLC), medium access control (MAC) and/or physical (PHY) layers of the NR protocol stack for the access node. The operations of the DU may be at least partly controlled by the CU. It should also be understood that the distribution of functions between DU 105 and CU 108 may vary depending on implementation. The CU may comprise a control plane (CU-CP), which may be a logical node hosting the RRC and the control plane part of the PDCP protocol of the NR protocol stack for the access node. The CU may further comprise a user plane (CU-UP), which may be a logical node hosting the user plane part of the PDCP protocol and the SDAP protocol of the CU for the access node.

Cloud computing systems may also be used to provide the CU 108 and/or DU 105. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean access node operations to be carried out, at least partly, in a computing system operationally coupled to a remote radio head (RRH) or a radio unit (RU) of an access node. It is also possible that access node operations may be performed on a distributed computing system or a cloud computing system located at the access node. Application of cloud RAN architecture enables RAN real-time functions being carried out at the access network (e.g., in a DU 105)

and non-real-time functions being carried out in a centralized manner (e.g., in a CU 108).

It should also be understood that the distribution of functions between core network operations and access node operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 110 and the access node 104. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 106 in the mega-constellation may cover several satellite-enabled network entities that create on-ground cells. The on-ground cells may be created through an on-ground relay access node or by an access node 104 located on-ground or in a satellite.

It is obvious for a person skilled in the art that the access node 104 depicted in FIG. 1 is just an example of a part of an access network (e.g., a radio access network) and in practice, the access network may comprise a plurality of access nodes, the UEs 100, 102 may have access to a plurality of radio cells, and the access network may also comprise other apparatuses, such as physical layer relay access nodes or other entities. At least one of the access nodes may be a Home eNodeB or a Home gNodeB. A Home gNodeB or a Home eNodeB is a type of access node that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The access node(s) of FIG. 1 may provide any kind of these cells. A cellular radio network may be implemented as a multilayer access networks including several kinds of radio cells. In multilayer access networks, one access node may provide one kind of a radio cell or radio cells, and thus a plurality of access nodes may be needed to provide such a multilayer access network.

For fulfilling the need for improving performance of access networks, the concept of "plug-and-play" access nodes may be introduced. An access network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's access network, may aggregate traffic from a large number of Home eNodeBs or Home gNodeBs back to a core network of the operator.

6G wireless communication networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

In NR Release 17 (Rel-17), the 3rd generation partnership project (3GPP) has introduced low-complexity and power-efficient UEs called reduced capability (RedCap) devices. RedCap devices may also be referred to as RedCap UEs, NR-Lite devices, or NR-Light devices.

RedCap devices may have, for example, the following features: a reduced number of transmit and/or receive antennas, a bandwidth reduction (e.g., 20 MHz in frequency range 1, and 100 MHz in frequency range 2), half-duplex frequency-division duplexing (FDD), and/or relaxed processing capability compared to non-RedCap UEs.

Power saving and battery lifetime enhancement are some of the main objectives for RedCap devices. This may be enabled by several techniques, such as reduced physical downlink control channel (PDCCH) monitoring by smaller numbers of blind decodes and control channel element (CCE) limits, extended discontinuous reception (DRX) for RRC inactive and/or idle state, and/or radio resource management (RRM) measurement relaxation for stationary devices.

Industrial wireless sensors are one example of RedCap devices. It may be desirable to connect industrial wireless sensors to 5G radio access and core networks in order to improve flexibility, enhance productivity and efficiency, and improve operational safety. Industrial wireless sensors may comprise, for example, pressure sensors, humidity sensors, thermometers, motion sensors, and/or accelerometers, etc. For industrial wireless sensor use cases, RedCap devices may have the following requirements: communication service availability is at least 99.99%, end-to-end latency is less than 100 ms, the reference bit rate is less than 2 Mbps (potentially asymmetric, e.g., UL heavy traffic), and the device is expected to be mostly stationary. For safety-related sensors, the latency requirement may be more stringent, for example 5-10 ms.

Video surveillance cameras are another example of Red-Cap devices. The deployment of surveillance cameras may be beneficial, for example, for smart city use cases, as well as for factories and industries, in order to monitor and control city or factory resources more efficiently. The following requirements may apply for video surveillance use cases: the reference economic video bitrate is 2-4 Mbps, latency is less than 500 ms, and the reliability is at least 99%-99.9%. High-end video applications (e.g., for farming) may require a video bitrate of 7.5-25 Mbps. It is noted that the traffic pattern may be dominated by UL transmissions.

Wearables, such as smart watches, rings, eHealth-related devices, personal protection equipment, and/or medical monitoring devices, are another example of RedCap devices. The following requirements may apply for wearables: the reference bitrate for smart wearable applications may be 5-50 Mbps in DL and 2-5 Mbps in UL, and the peak bit rate of the device may be higher, for example up to 150 Mbps for DL and up to 50 Mbps for UL. In addition, the battery of the wearable device should last multiple days (e.g., up to 1-2 weeks).

Due to human mobility, smart wearable devices are becoming increasingly useful, since they can collect and send data on the move and accordingly receive information from the network, which helps in making smarter decisions.

In NR Release 18 (Rel-18), 3GPP is specifying further device complexity reductions for RedCap devices in frequency range 1 (FR1). The goal is to introduce lower-tier devices between massive IoT and Rel-17 RedCap devices. The supported peak data rate for the Rel-18 RedCap devices is expected to be approximately 10 Mbps.

For example, the further reduced complexity of Rel-18 RedCap devices in FR1 may involve UE baseband (BB) bandwidth reduction, such that 5 MHz BB bandwidth is exclusive for physical downlink shared channel (PDSCH) (for both unicast and broadcast) and physical uplink shared channel (PUSCH), with 20 MHz radio frequency (RF) bandwidth for UL and DL. The other physical channels and signals are still allowed to use a bandwidth part (BWP) up to the 20 MHz maximum RF+BB bandwidth.

Furthermore, the further reduced complexity of Rel-18 RedCap devices in FR1 may involve UE peak data rate reduction, support for both 15 kHz subcarrier spacing (SCS) and 30 kHz SCS, and an aim to define at most one Rel-18 RedCap device type for the further UE complexity reduction. The current UE capability framework may be used, and changes to capability signalling may be specified only if necessary. By default, all UE capabilities applicable to a Rel-17 RedCap device may be applicable to Rel-18 RedCap devices, unless otherwise specified.

Figure 2:
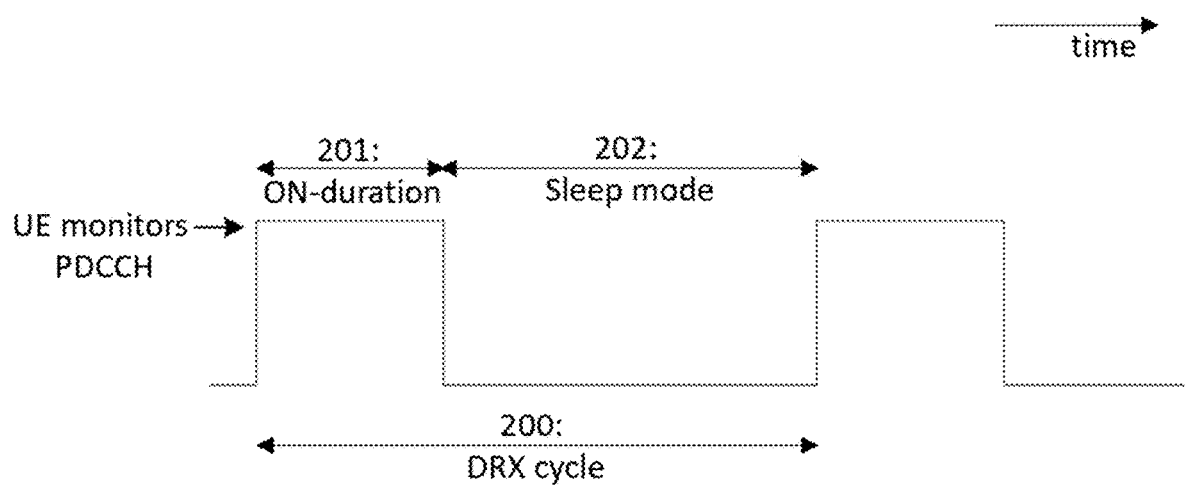
FIG. 2 illustrates a discontinuous reception cycle.

FIG. 2 illustrates a discontinuous reception (DRX) cycle 200. The purpose of the DRX mechanism is to provide efficient UE power-saving, and hence to optimize the UE battery lifetime. By applying the received DRX configuration, UEs are allowed to enter into a sleep mode 202 (with RF module turned off) after a certain data inactivity period, and to wake up periodically during the ON-duration 201 for eventual data reception or for initiating data transmission. In other words, the power consumption of the UE may be reduced during the sleep mode 202. The DRX operation applies to UEs in RRC connected state (using C-DRX configuration), as well as UEs in RRC idle or inactive state (through paging configuration). The C-DRX configuration may include, for example, the length of the DRX cycle 200 (short and/or long cycle), the length of the ON-duration 201 for DL channel monitoring, and the inactivity timer. The network (e.g., gNB) may provide the DRX configuration to the UE via a dedicated RRC reconfiguration message (e.g., during handover) or in system information block type 2 (SIB2) broadcasted by gNBs (during initial attach). Long DRX cycles may be applied, if there is no data activity. Short and multiple DRX cycles may be applied in case of periodic DL data arrival.

Positioning is a process that may be used to estimate a position (e.g., a geographic location) of a UE. Herein the UE to be positioned may be referred to as a target UE. The position of the target UE may be estimated in an absolute manner (in case of absolute positioning) or in a relative manner (in case of relative positioning). Absolute positioning refers to estimating the position of the target UE in two-dimensional or three-dimensional geographic coordinates (e.g., latitude, longitude, and/or elevation) within a coordinate system. Relative positioning refers to estimating the position of the target UE relative to one or more network nodes or relative to one or more other UEs.

For example, the positioning techniques used in 5G NR may be based on at least one of the following: time difference of arrival (TDoA), time of arrival (TOA), time of departure (TOD), round trip time (RTT), angle of departure (AoD), angle of arrival (AoA), and/or carrier phase.

TOA is the time it takes for a signal to travel from a base station to a UE. The UE measures the time it takes for a signal to arrive from a single base station. This information can be used to calculate the distance between the UE and the base station, assuming the propagation speed of the signal is known.

TDoA is the difference in arrival times of signals from two different base stations. The UE may measure the difference in time it takes for signals from two different base stations to reach it. This information can be used to calculate the UE's position.

In order to obtain a positioning measurement in the DL, a positioning reference signal (PRS) may be transmitted from one or more network nodes (e.g., base stations such as gNBs) in known locations, and measured by the UE. In order to obtain a positioning measurement in the UL, a sounding reference signal (SRS) for positioning may be transmitted by the UE and measured by one or more network nodes (e.g., gNBs) in known locations. The positioning measurements may be measured in a physical layer. Depending on DL or UL, the UE's baseband modem or the gNB's baseband modem may support the positioning measurements using PRS or SRS.

In network-based positioning, the position of the target UE is estimated by a network entity (e.g., gNB or LMF). For network-based positioning, the target UE may report information to the network entity to enable estimating the position of the target UE.

In UE-based positioning, the position of the target UE is estimated by the target UE.

Sidelink (SL) positioning refers to the positioning approach, where the target UE utilizes the sidelink (i.e., the direct device-to-device link) to position itself, either in an absolute manner (in case of absolute positioning) or in a relative manner (in case of relative positioning). SL positioning may be beneficial in, for example (but not limited to), the following use cases: public safety, vehicle-to-everything (V2X), and industrial internet of things (IIoT).

SL positioning may be based on the transmission of a sidelink positioning reference signal (SL PRS) by multiple anchor UEs (e.g., at least three anchor UEs), wherein the SL PRS is received and measured by a target UE to enable positioning of the target UE (e.g., using SL TDoA techniques) within certain latency and accuracy requirements of the corresponding SL positioning session. Alternatively, or additionally, the target UE may transmit SL PRS to be received and measured by the anchor UEs. The exchange of SL PRS between the target UE and anchor UEs may be used, for example, in SL RTT based positioning techniques.

The target positioning accuracy requirements for RedCap devices for commercial use cases may be defined as follows: indoor and outdoor, horizontal position accuracy (<3 m) for 90% of UEs, and vertical position accuracy (<3 m) for 90% of UEs.

The target positioning accuracy requirements for RedCap devices for IIoT use cases may be defined as follows:

horizontal position accuracy (<1 m) for 90% of UEs, and vertical position accuracy (<3 m) for 90% of UEs.

As noted above, RedCap devices are bandwidth-limited devices. However, the accuracy of the positioning is proportional to the bandwidth of the PRS or SRS for (time-based) positioning techniques defined by NR Rel-16 and NR Rel-17.

Frequency hopping is one possible solution in order to solve the issue of limited bandwidth with RedCap for positioning.

Figure 3:
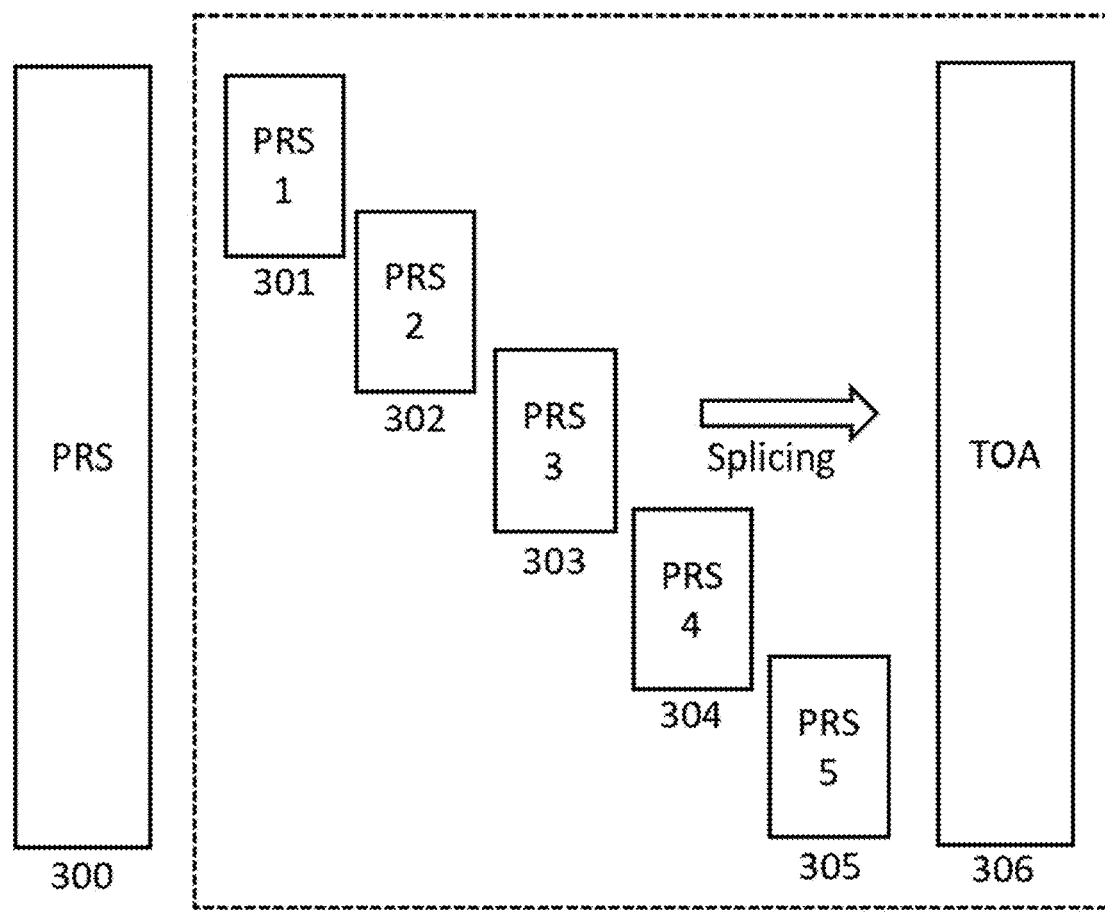
FIG. 3 illustrates an example of a solution for an overlapped frequency hopping positioning measurement technique with phase compensation.

FIG. 3 illustrates an example of a solution for an overlapped frequency hopping positioning measurement technique with phase compensation. In order to increase the hearability, increase correlation properties, and improve the interference avoidance properties, the PRS sequence 300 may be spread over the time domain and frequency domain. This may be referred to as staggered PRS. In other words, the gNB may transmit a wide-band PRS 300 during all of the hops 301, 302, 303, 304, 305, but the UE (e.g., RedCap device) may receive a small band of the PRS at a time. These frequency hops 301, 302, 303, 304, 305 collected by the UE may also be referred to as PRS bins or frequency bins herein. To do this, various configuration parameters (e.g., comb-size, repetition factor, periodicity, bandwidth factors, etc.) for PRS may be defined. The receiver (i.e., UE) may perform phase estimation and compensation for every two adjacent hops. The UE may aggregate the PRS bins 301, 302, 303, 304, 305 into an aggregated band 306. The final positioning result may be obtained by utilizing the "wide-band" positioning reference signal 306 spliced by the positioning reference signals from several consecutive hops. For example, the UE may estimate time of arrival (TOA) by using the aggregated band 306. However, there is a challenge in how to coordinate the PRS with other signaling (e.g., DRX).

Figure 4:
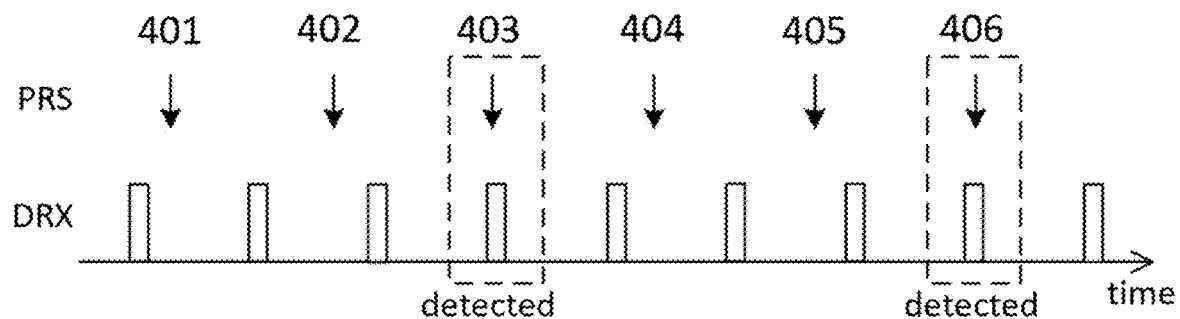
FIG. 4 illustrates an example of misalignment between a positioning reference signal and discontinuous reception.

FIG. 4 illustrates an example of misalignment between PRS and DRX. The DRX cycle applied by a UE (e.g., RedCap device) and DL PRS configured by LMF are independent procedures. As shown in FIG. 4, these independent procedures may result in a misalignment between PRS transmission and the DRX occasions, resulting in poor positioning measurements. In the example of FIG. 4, the UE may detect the PRS 403 and PRS 406 that are transmitted during the ON-duration of the DRX cycle. However, in this example, the UE may miss the other PRSs 401, 402, 404, 405 that are transmitted while the UE is sleeping according to the DRX cycle.

One possible solution to the misalignment seen in FIG. 4 could be to force the UE to wake up to perform PRS measurements over the duration of PRS transmission occasions. However, this would increase the power consumption of the UE, and therefore also violate the objective of the DRX cycle introduced for RedCap devices.

On the other hand, if the UE does not wake up during the PRS transmission occasions, the UE cannot perform the PRS measurement at the corresponding PRS transmission occasion, which may lead to positioning failure. More specifically, if the frequency hopping positioning measurement technique (e.g., as shown in FIG. 3) is applied, the UE may not be able to receive all the PRS bins due to its DRX cycle.

In addition to the DRX cycle mismatch, another possible cause for missing PRS bins may be PRS priority with respect to another channel. For example, during PRS hop-1, if there is another channel (e.g., data) with higher priority, then PRS hop-1 will not be received.

Figure 5A:
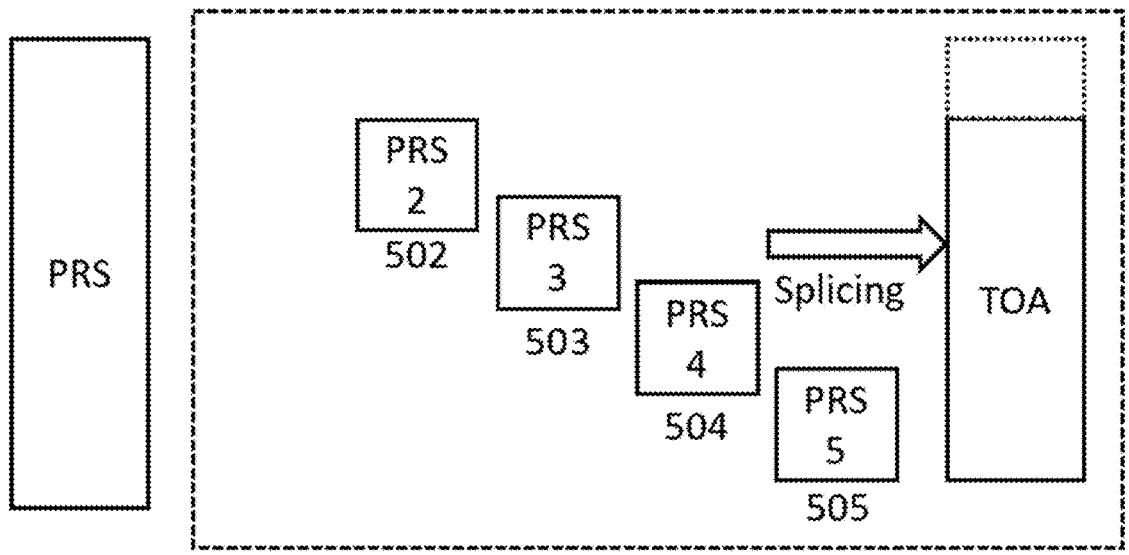
FIG. 5A illustrates an example with a missing positioning reference signal bin.
Figure 5B:
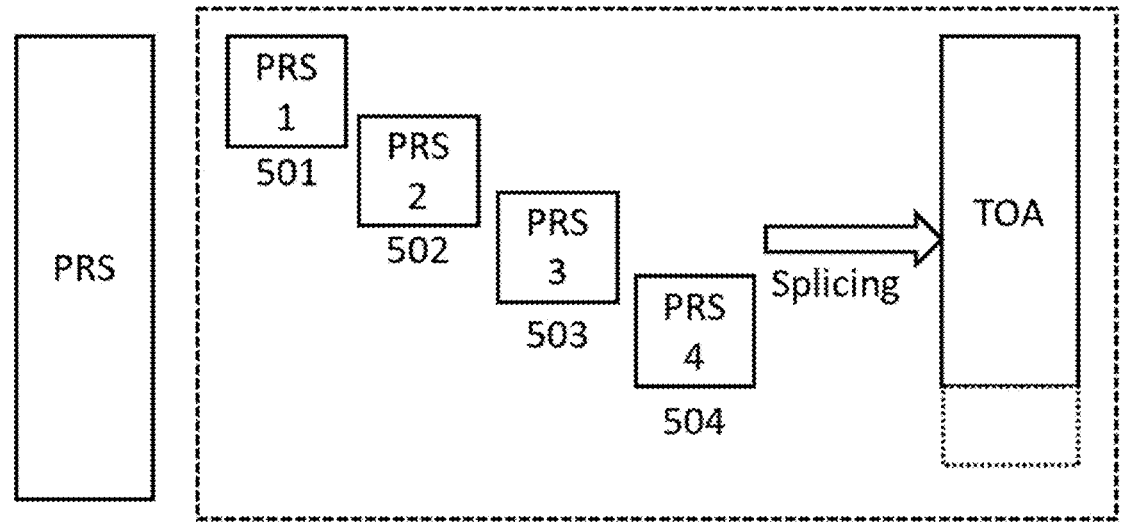
FIG. 5B illustrates an example with a missing positioning reference signal bin.
Figure 5C:
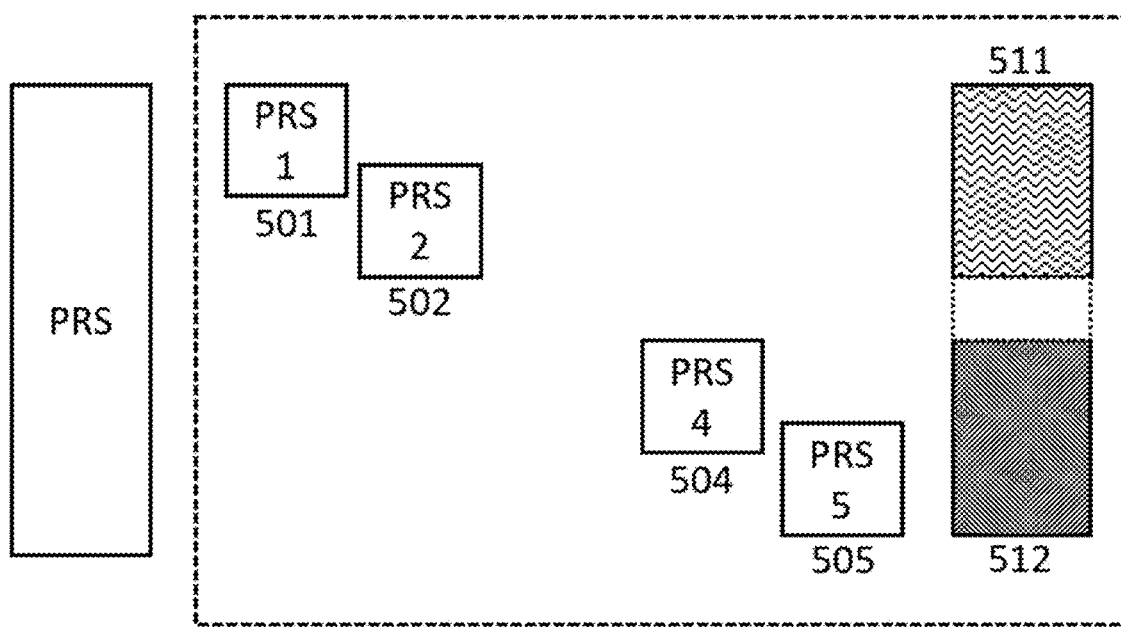
FIG. 5C illustrates an example with a missing positioning reference signal bin.

Some issues that may be encountered due to one or more missing PRS bins are shown in FIGS. 5A, 5B and 5C.

In FIG. 5A, the first PRS bin 501 is missing. In this case, phase compensation among the received PRS bins 502, 503, 504, 505 is possible, as there is overlap between the PRS bins.

In FIG. 5B, the last PRS bin 505 is missing. In this case, phase compensation among the received PRS bins 501, 502, 503, 504 is possible, as there is overlap between the PRS bins.

In FIG. 5C, an intermediate PRS bin 503 is missing. In this case, phase compensation among the received PRS bins 501, 502, 504, 505 is not possible, as there is no overlap between the first two bins 501, 502 and the last two bins 504, 505. This causes phase discontinuity, which is highlighted using different hatch patterns at 511 and 512 in FIG. 5C.

Thus, in order to effectively utilize or deal with the partially received PRS bins (e.g., as shown in FIG. 5A, 5B or 5C) and improve the positioning accuracy, there is a need to define a new positioning procedure between the LMF and UE (e.g., RedCap device) for the frequency hopping positioning measurement technique. In other words, a method is needed to receive the minimum required PRS sequence, or to utilize the partially received PRS bins to efficiently perform the UE positioning within the required accuracy, as the UE may not be able to receive all N subbands or bins within a DRX cycle. That is, the network may need to take additional decisions during positioning measurement, based on the information sent by the UE, in order to improve the positioning integrity and/or accuracy.

Some example embodiments are described below using principles and terminology of 5G radio access technology without limiting the example embodiments to 5G radio access technology, however.

Some example embodiments may provide solutions to overcome the misalignment between DRX and DL PRS, as illustrated in FIG. 4, as well as the issues in FIGS. 5A, 5B and 5C for the frequency hopping positioning measurement technique.

Some example embodiments may provide an LMF-based procedure to deal with missed PRS bin(s), while using the frequency hopping positioning measurement technique.

In certain scenarios (e.g., UE environment is static, no-fading, no-mobility, strong line of sight, etc.), the LMF may reuse any missed PRS bin from earlier successful frequency hopping reception(s) to increase the received PRS bandwidth for improved TOA estimation accuracy.

The example embodiments described herein may reduce constant monitoring of PRS by the UE. Furthermore, the example embodiments may reduce computational load associated with positioning-related parameters at the UE side and shift it to the LMF side, as well as reduce power consumption of the UE. Moreover, the example embodiments may allow the LMF to adaptively adjust channel characteristics and associated thresholds for improved positioning accuracy.

Figure 6A:
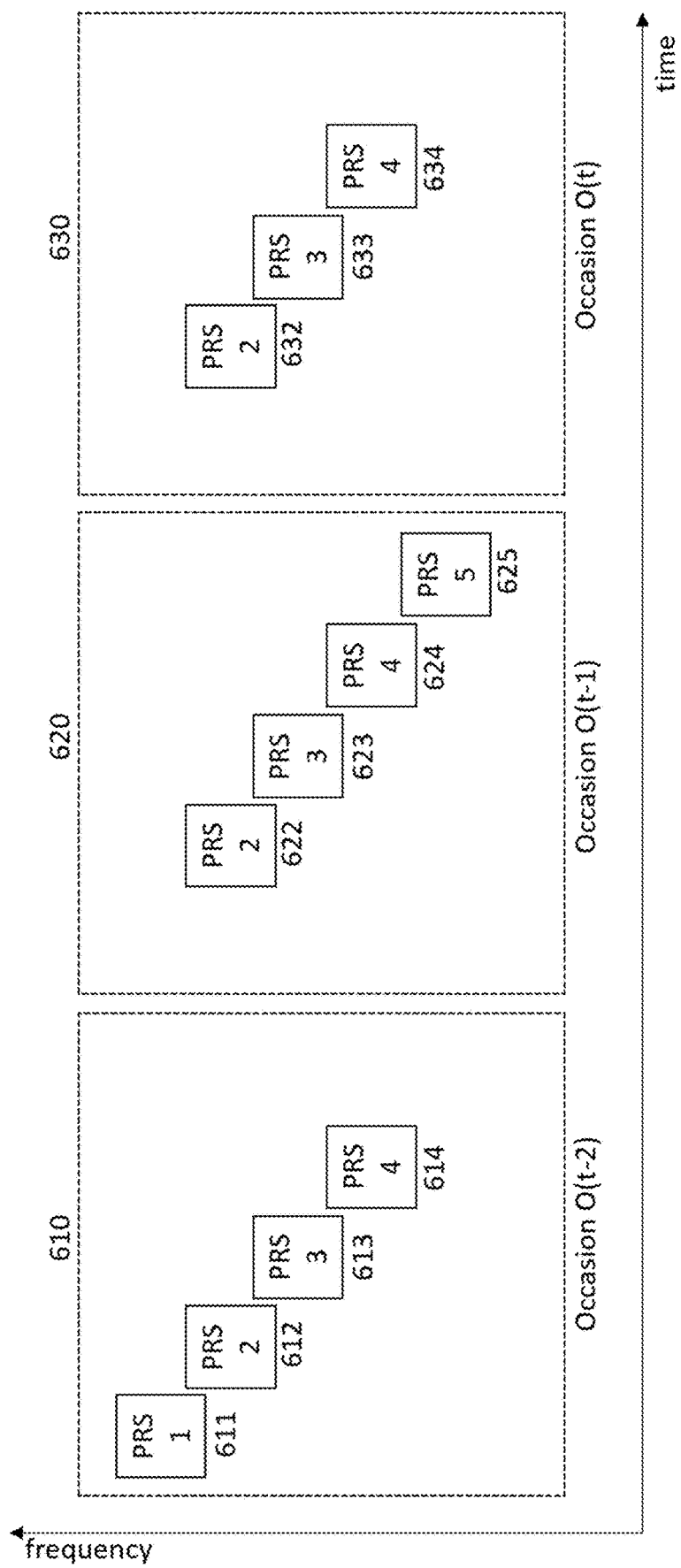
FIG. 6A illustrates an example with missed positioning reference signal bins.
Figure 6B:
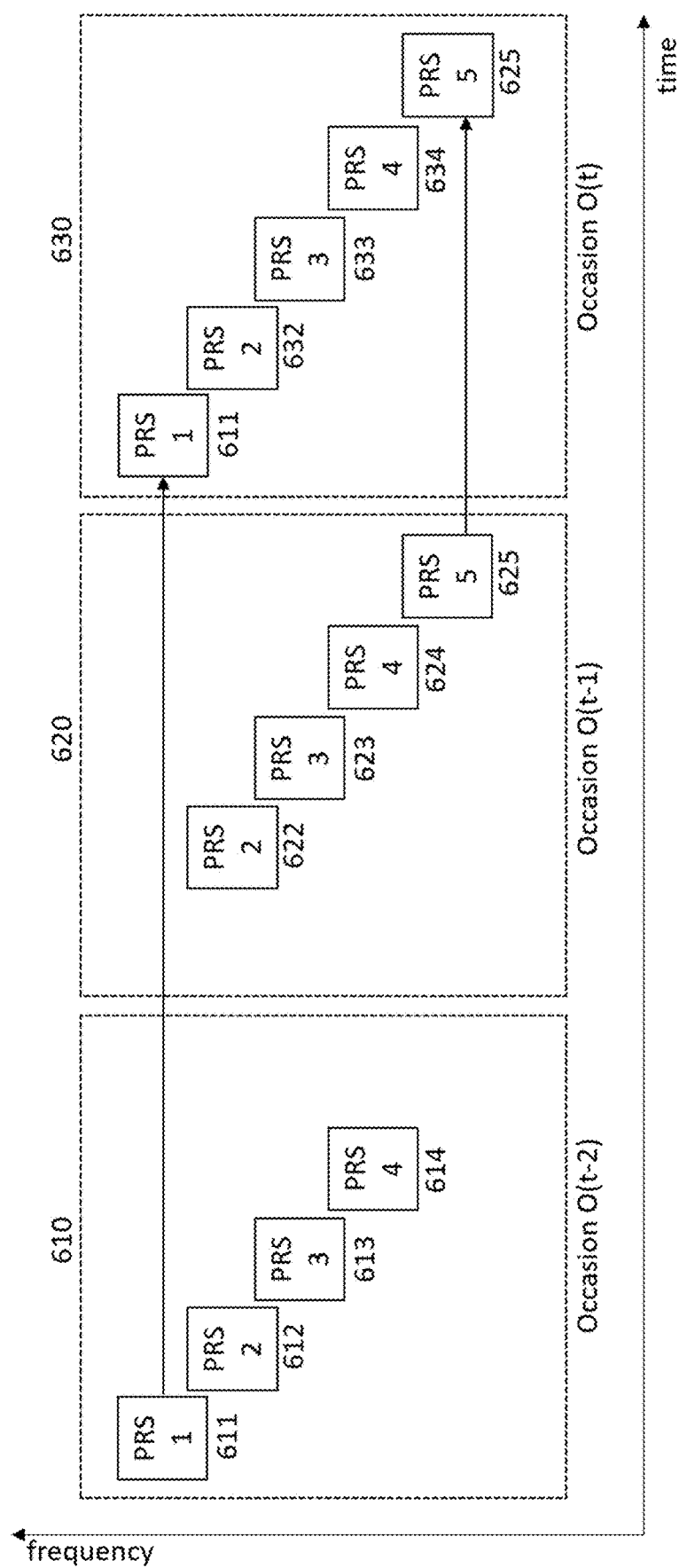
FIG. 6B illustrates an example of replacing missed positioning reference signal bins with previous positioning reference signal bins.

FIGS. 6A and 6B illustrate an example of replacing missed PRS bins with previous PRS bins that were successfully received in previous time occasions.

In FIG. 6A, in the first set of frequency hops 610 during frequency hopping time occasion O(t−2), the UE has successfully received the PRS1 bin 611, PRS2 bin 612, PRS3 bin 613, and PRS4 bin 614.

In the second set of frequency hops 620 during frequency hopping time occasion O(t−1), the UE has successfully received the PRS2 bin 622, PRS3 bin 623, PRS4 bin 624, and PRS5 bin 625.

In the third set of frequency hops 630 during frequency hopping time occasion O(t), the UE has successfully received the PRS2 bin 632, PRS3 bin 633, and PRS4 bin 634. However, the UE has missed the PRS1 bin and the PRS5 bin of the third set of frequency hops 630 during the frequency hopping time occasion O(t).

Based on the channel condition (e.g., UE mobility environment, etc.), the LMF may decide whether to reuse the PRS1 bin 611 from the earlier successful frequency hopping reception (frequency hopping occasion O(t−2)), and the PRS5 bin 625 of frequency hopping time occasion O(t−1) for positioning measurement (e.g., for TOA estimation, as a larger bandwidth increases the accuracy). In other words, as shown in FIG. 6B, the missed PRS1 bin of the third set of frequency hops 630 may be replaced with the successfully received PRS1 bin 611 from the first set of frequency hops 610, and the missed PRS5 bin of the third set of frequency hops 630 may be replaced with the successfully received PRS5 bin 625 from the second set of frequency hops 610. This results in a wide-band PRS in occasion O(t).

Figure 7:
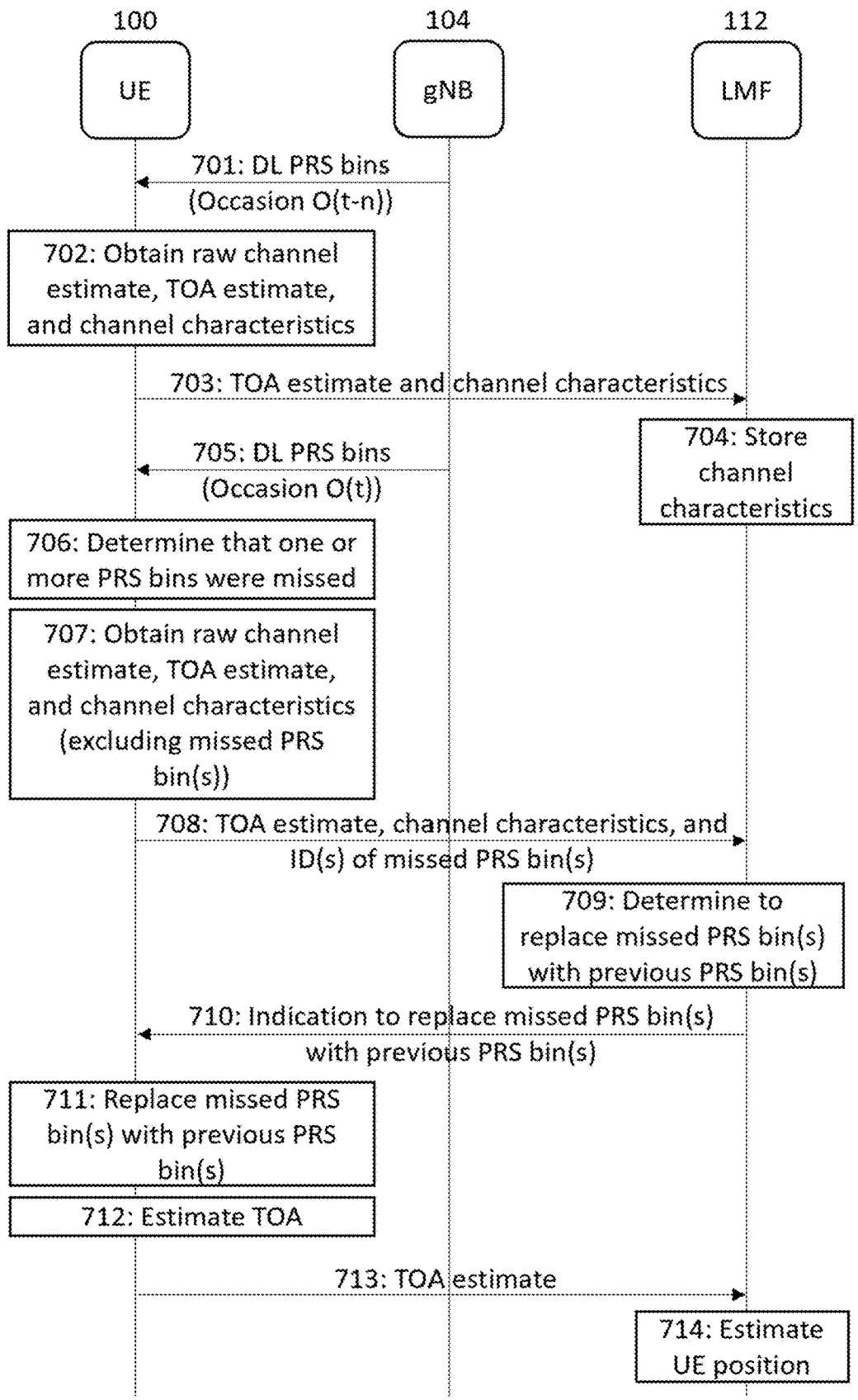
FIG. 7 illustrates a signal flow diagram.

FIG. 7 illustrates a signal flow diagram according to an example embodiment, wherein positioning measurement is performed using a frequency hopping configuration.

Referring to FIG. 7, at 701, at least one RAN node 104 (e.g., gNB) transmits a plurality of positioning reference signals of a first set of frequency hops at time occasion O(t−n). The positioning reference signals may also be referred to as PRS bins or frequency bins or frequency hops herein. The UE 100 receives the plurality of positioning reference signals (PRS bins) of the first set of frequency hops. In other words, in this case, the UE may not miss any PRS bins during positioning measurement for PRS using frequency hopping. The UE 100 may be a reduced capability (RedCap) device or any other type of UE.

At 702, the UE 100 obtains a raw channel estimate of the plurality of received positioning reference signals (PRS bins) of the first set of frequency hops. For example, the UE 100 may obtain a raw channel estimate of each received PRS bin. Based on the raw channel estimate, the UE 100 determines a timing measurement, such as a time of arrival (TOA) estimate or a time difference of arrival (TDoA) estimate, and one or more channel characteristics of the plurality of received positioning reference signals (PRS bins) of the first set of frequency hops. In other words, the UE 100 extracts the one or more channel characteristics during the measurement of each PRS bin. The UE 100 may determine the timing measurement by utilizing or aggregating the plurality of positioning reference signals (i.e., all the received hops), resulting in a wide-band PRS. Alternatively, or additionally, the UE 100 may determine one or more other positioning-related measurements, such as an angle of arrival (AoA), based on the aggregated PRS.

For example, the one or more channel characteristics may comprise at least one of: a channel impulse response (CIR), a channel flatness probability (CFP), a reference signal received power (RSRP), a reference signal received quality (RSRQ), or a power delay profile (PDP) with a certain PDP-length (PDP-length to be configured by the LMF). The CFP, RSRP and RSRQ may be expressed as values. The CIR is a complex function that describes how a given channel modifies a signal that is sent over it. The PDP is a function that provides information about how the power of a received signal is distributed as a function of time delay.

The term "raw channel estimate" refers to the initial estimate of these channel characteristics, before any quantization, baseband oversampling, or other signal processing has been applied. In other words, the raw channel estimate is a direct measurement or estimate of the channel response. The raw channel estimates can be obtained using various techniques, such as pilot symbols, training sequences, or other known signal features.

For example, let H denote the channel, and X denote a PRS symbol. Then the received signal Y=HX+noise. The raw channel estimate is Y/X=H+noise/X. Depending on the bandwidth, there may be PRS symbols X1, X2, X3, X4, X5, . . . . Xn. As an example, a first PRS bin (PRS bin-1) may include [X1 X2 X3 X4], and a second PRS bin (PRS bin-2) may include [X4 X5 X6 X7]. Then TOA may be estimated from the (aggregated) raw channel estimates, and the one or more channel characteristics may be derived for each raw channel estimate.

At 703, the UE 100 transmits, to a location management entity such as an LMF 112, information indicating at least the timing measurement and/or AoA, and the one or more channel characteristics of the plurality of received positioning reference signals of the first set of frequency hops. The UE 100 may transmit the information to the LMF 112 via a RAN node 104 (e.g., gNB). The LMF 112 receives the information.

The information may further indicate one or more time stamps associated with the one or more channel characteristics, and an identifier of each received PRS bin. In other words, the UE 100 may send the estimated one or more channel characteristics of each received PRS bin with a time stamp to the LMF 112.

At 704, the LMF 112 stores or saves the one or more channel characteristics for each received PRS bin of time occasion O(t−n) in at least one memory with time stamp along with the PRS bin ID for a duration of a certain memory window length.

At 705, the at least one RAN node 104 (e.g., gNB) transmits a plurality of positioning reference signals (PRS bins) of a second set of frequency hops at time occasion O(t) (i.e., the second set of frequency hops is transmitted at a later time compared to the first set of frequency hops). The UE 100 receives one or more positioning reference signals (PRS bins) of the second set of frequency hops.

At 706, the UE 100 determines that one or more positioning reference signals (PRS bins) were missed in the second set of frequency hops, and the UE 100 determines one or more identifiers of the one or more missed positioning reference signals (i.e., an identifier of each missed PRS bin) of the second set of frequency hops. The UE may be pre-configured with a DL PRS configuration that indicates the PRS bins that the UE is supposed to receive, and thus the UE may determine the one or more missed positioning reference signals (PRS bins) based on the DL PRS configuration.

For example, the UE 100 may miss the one or more PRS bins due to its DRX cycle, if the UE 100 is sleeping at the time when those PRS bin(s) are transmitted. As another example, even if the UE is awake, it may still miss one or more PRS bins, if the priority of PRS is smaller compared with another channel (e.g., data).

At 707, the UE 100 obtains a raw channel estimate of the one or more received positioning reference signals (PRS bins) of the second set of frequency hops. For example, the UE 100 may obtain a raw channel estimate of each received PRS bin. Based on the raw channel estimate, the UE 100 determines a timing measurement, such as a TOA estimate or a TDoA estimate, and one or more channel characteristics of the one or more received positioning reference signals (PRS bins) of the second set of frequency hops. In other words, the UE 100 extracts the one or more channel characteristics during the measurement of each received PRS bin. The UE 100 may determine the timing measurement by utilizing or aggregating the one or more received positioning reference signals (i.e., all the received hops), resulting in a wide-band PRS. It should be noted that the one or more missed positioning reference signals (missed PRS bins) are excluded from the timing measurement. Alternatively, or additionally, the UE 100 may determine one or more other positioning-related measurements, such as an angle of arrival (AoA), based on the aggregated PRS.

At 708, the UE 100 transmits, to the LMF 112, information indicating the timing measurement and/or AoA of the one or more received positioning reference signals (PRS bins) of the second set of frequency hops (excluding the one or more missed PRS bins), the one or more channel characteristics of the one or more received positioning reference signals (PRS bins) of the second set of frequency hops, and the one or more identifiers of the one or more missed positioning reference signals of the second set of frequency hops (i.e., an identifier of each missed PRS bin). The UE 100 may transmit the information to the LMF 112 via a RAN node 104 (e.g., gNB). The LMF 112 receives the information. The LMF 112 may store or save the information in at least one memory.

The information may further indicate one or more time stamps associated with the one or more channel characteristics, and an identifier of each received PRS bin of the second set of frequency hops. In other words, the UE 100 may send the estimated one or more channel characteristics of each received PRS bin with a time stamp to the LMF 112.

With this signaling, the UE 100 asks the LMF 112 the optimal way for dealing with the one or more missed PRS bins. The network (e.g., the LMF 112) has more processing power and memory than the UE 100, so the available information on extracted channel characteristics of PRS bins, with identifiers, and time stamp may be used to make a decision regarding the one or more missed PRS bins. The network (e.g., the LMF 112), based on the collected information on the channel characteristics of the received PRS bins between occasion O(t) and occasion O(t-n), may come up with different options, including retransmission of the one or more missed PRS bins, or replacing the one or more missed PRS bins with previously received PRS bins (e.g., from occasion O(t-n)).

At 709, the LMF 112 determines whether to replace the one or more missed PRS bins with one or more previous PRS bins from occasion O(t-n). For example, the LMF may compare the channel characteristics between the time occasions O(t) and O(t-n), or use a learning-based algorithm, such as an artificial intelligence or machine learning algorithm, to decide whether previous time instances of a given PRS bin could be utilized in case of a missed PRS bin. If yes with a high probability, the LMF 112 may signal the UE 100 to use the previous PRS bin in place of a missed one, and send back the estimated positioning measurement (e.g., TOA).

As another option, the LMF 112 may instruct the UE 100 to use a weighted average of previously correctly received PRS bins corresponding to the missed PRS bin(s). For example, if PRS1 bin is missed at occasion O(t), then the missed PRS1 bin may be replaced by a weighted average of the PRS1 bin correctly received at occasion O(t-1), O(t-2), and O(t-3).

As an example (see FIG. 6A), the LMF may compare one or more channel characteristics of the received PRS2 bin 632 of occasion O(t) and the received PRS2 bin 622 of occasion O(t-1) to determine whether to replace the missed PRS5 bin of occasion O(t) with the received PRS5 bin 625 of occasion O(t-1). If the channel characteristics between the time occasions (e.g., between the PRS2 bin 632 and the PRS2 bin 622 are similar), then the LMF may decide to replace the missed PRS bin(s) with the previously received PRS bin(s). The identifiers of the one or more previously received PRS bins to be used as replacements may correspond to the identifiers of the one or more missed PRS bins (e.g., the PRS5 bin 625 of occasion O(t-1) may be used to replace the corresponding missed PRS5 bin of occasion O(t)).

In this way, the one or more missed positioning reference signals (PRS bins) may be compensated by utilizing one or more previous positioning reference signals (PRS bins) from the first set of frequency hops (i.e., a previous set of frequency hops), based at least on the one or more channel characteristics of the one or more received positioning reference signals of the second set of frequency hops and one or more corresponding channel characteristics of one or more corresponding positioning reference signals received (by the UE 100) in the first set of frequency hops.

Some further examples of determining whether to replace the one or more missed PRS bins are described below with reference to FIG. 10.

At 710, based on determining to replace the one or more missed positioning reference signals (PRS bins), the LMF 112 transmits, to the UE 100, an indication indicating to replace the one or more missed positioning reference signals (PRS bins) of the second set of frequency hops with the one or more previous positioning reference signals (PRS bins) from the first set of frequency hops, and to transmit a new timing measurement to the LMF 112 based on the replacement. In other words, the LMF 112 indicates its decision to replace the one or more missed PRS bins with the one or more previous PRS bins to the UE 100. The LMF 112 may transmit the indication to the UE 100 via a RAN node 104 (e.g., gNB).

At 711, the UE 100 replaces, based on the indication, the one or more missed positioning reference signals (PRS bins) with the one or more previous positioning reference signals (PRS bins) by using the raw channel estimate of the one or more previous positioning reference signals (obtained at 702). The replacement may mean, for example, that the raw channel estimates of the one or more previous positioning reference signals (PRS bins) from occasion O(t-n) are combined with the raw channel estimates of the one or more received positioning reference signals (PRS bins) of occasion O(t).

At 712, the UE 100 determines, based on the replacement, a timing measurement, such as a TOA estimate or a TDoA estimate, associated with the one or more received positioning reference signals (PRS bins) of the second set of frequency hops (occasion O(t)) and the one or more previous positioning reference signals (PRS bins) of the first set of frequency hops (occasion O(t-n)) that were used to replace the one or more missed positioning reference signals (PRS bins) of the second set of frequency hops. In other words, the UE 100 may obtain the timing measurement by utilizing or aggregating the one or more received positioning reference signals (PRS bins) of the second set of frequency hops and the one or more previous positioning reference signals (PRS bins) of the first set of frequency hops, resulting in a wide-band PRS. Alternatively, or additionally, the UE 100 may determine one or more other positioning-related measurements, such as an angle of arrival (AoA), based on the aggregated PRS.

At 713, the UE 100 transmits, or reports, to the LMF 112, the timing measurement and/or AoA associated with the one or more received positioning reference signals (PRS bins) of the second set of frequency hops and the one or more previous positioning reference signals (PRS bins) of the first set of frequency hops. The UE 100 may transmit the timing measurement to the LMF 112 via a RAN node 104 (e.g., gNB). The LMF 112 receives, from the UE 100, based on transmitting the indication, the timing measurement associated with the one or more received positioning reference signals of the second set of frequency hops and the one or more previous positioning reference signals of the first set of frequency hops.

At 714, the LMF 112 estimates a position (i.e., location) of the UE 100 based at least partly on the timing measurement (e.g., TOA estimate or TDoA estimate) and/or AoA associated with the one or more received positioning reference signals (PRS bins) of the second set of frequency hops and the one or more previous positioning reference signals (PRS bins) from the first set of frequency hops. For example, the TOA estimate may be used to estimate a distance between the UE 100 and the at least one RAN node 104. The location of the at least one RAN node 104 may be known by the LMF 112, and thus the LMF may estimate the position of the UE 100 based on the distance between the UE 100 and the at least one RAN node 104.

For a two-dimensional position estimate of the UE 100, a TOA estimate of at least two RAN nodes (e.g., gNBs) may be needed. For three-dimensional positioning (x, y, z coordinates) of the UE 100, the LMF may need a TOA estimate of at least three RAN nodes (e.g., gNBs).

Figure 8:
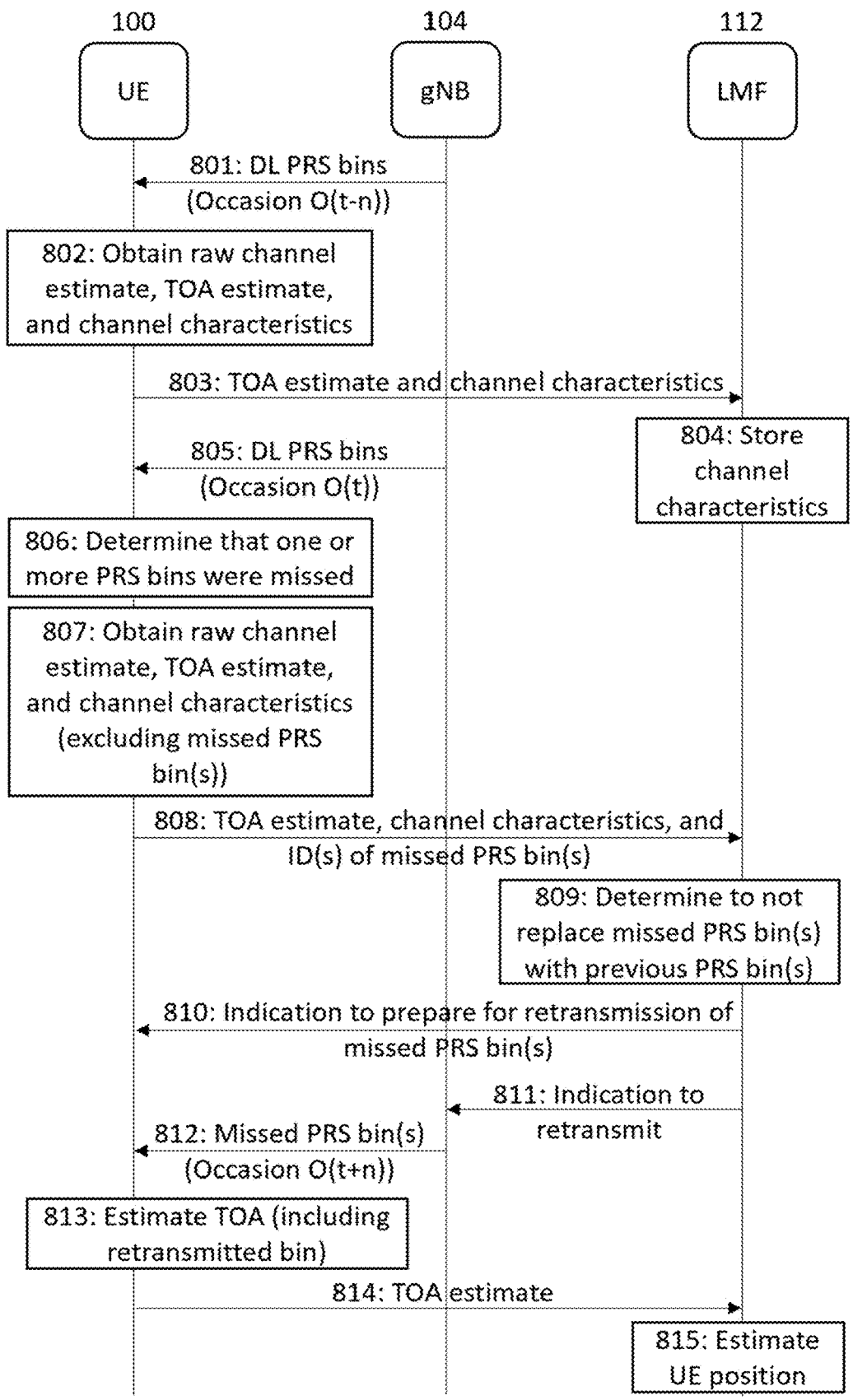
FIG. 8 illustrates a signal flow diagram.

FIG. 8 illustrates a signal flow diagram according to an example embodiment, wherein positioning measurement is performed using a frequency hopping configuration. In this example embodiment, if the LFM determines that it is not feasible to reuse a PRS bin from a previous occasion to replace a missed PRS bin, the LMF configures the gNB and the UE for a retransmission of the missed PRS bin.

Referring to FIG. 8, at 801, at least one RAN node 104 (e.g., gNB) transmits a plurality of positioning reference signals of a first set of frequency hops at time occasion O(t-n). The positioning reference signals may also be referred to as PRS bins or frequency bins or frequency hops herein. The UE 100 receives the plurality of positioning reference signals (PRS bins) of the first set of frequency hops. In other words, in this case, the UE may not miss any PRS bins during positioning measurement for PRS using frequency hopping. The UE 100 may be a reduced capability (RedCap) device or any other type of UE.

At 802, the UE 100 obtains a raw channel estimate of the plurality of received positioning reference signals (PRS bins) of the first set of frequency hops. In other words, the UE 100 may obtain a raw channel estimate of each received PRS bin. Based on the raw channel estimate, the UE 100 determines a timing measurement, such as a time of arrival (TOA) estimate or a time difference of arrival (TDoA) estimate, and one or more channel characteristics of the plurality of received positioning reference signals (PRS bins) of the first set of frequency hops. In other words, the UE 100 extracts the one or more channel characteristics during the measurement of each PRS bin. The UE 100 may determine the timing measurement by utilizing or aggregating the plurality of positioning reference signals (i.e., all the received hops), resulting in a wide-band PRS. Alternatively, or additionally, the UE 100 may determine one or more other positioning-related measurements, such as an angle of arrival (AoA), based on the aggregated PRS.

For example, the one or more channel characteristics may comprise at least one of: a channel impulse response (CIR), a channel flatness probability (CFP), a reference signal received power (RSRP), a reference signal received quality (RSRQ), or a power delay profile (PDP) with a certain PDP-length (PDP-length to be configured by the LMF).

At 803, the UE 100 transmits, to a location management entity such as an LMF 112, information indicating at least the timing measurement and/or AoA, and the one or more channel characteristics of the plurality of received positioning reference signals of the first set of frequency hops. The UE 100 may transmit the information to the LMF 112 via a RAN node 104 (e.g., gNB). The LMF 112 receives the information.

The information may further indicate one or more time stamps associated with the one or more channel characteristics, and an identifier of each received PRS bin. In other words, the UE 100 may send the estimated one or more channel characteristics of each PRS bin with a time stamp to the LMF 112. At 804, the LMF 112 stores or saves the one or more channel characteristics for each PRS bin of time occasion O(t-n) in at least one memory with time stamp along with the PRS bin ID for a duration of a certain memory window length.

At 805, the at least one RAN node 104 (e.g., gNB) transmits a plurality of positioning reference signals (PRS bins) of a second set of frequency hops at time occasion O(t) (i.e., the second set of frequency hops is transmitted at a later time compared to the first set of frequency hops). The UE 100 receives one or more positioning reference signals (PRS bins) of the second set of frequency hops.

At 806, the UE 100 determines that one or more positioning reference signals (PRS bins) were missed in the second set of frequency hops, and the UE 100 determines one or more identifiers of the one or more missed positioning reference signals (i.e., an identifier of each missed PRS bin) of the second set of frequency hops. The UE may be pre-configured with a DL PRS configuration that indicates the PRS bins that the UE is supposed to receive, and thus the UE may determine the one or more missed positioning reference signals (PRS bins) based on the DL PRS configuration.

At 807, the UE 100 obtains a raw channel estimate of the one or more received positioning reference signals (PRS bins) of the second set of frequency hops. For example, the UE 100 may obtain a raw channel estimate of each received PRS bin. Based on the raw channel estimate, the UE 100 determines a timing measurement, such as a TOA estimate or a TDoA estimate, and one or more channel characteristics of the one or more received positioning reference signals (PRS bins) of the second set of frequency hops. In other words, the UE 100 extracts the one or more channel characteristics during the measurement of each received PRS bin. The UE 100 may determine the timing measurement estimate by utilizing or aggregating the one or more received positioning reference signals (i.e., all the received hops), resulting in a wide-band PRS. It should be noted that the one or more missed positioning reference signals (missed PRS bins) are excluded from the timing measurement. Alternatively, or additionally, the UE 100 may determine one or more other positioning-related measurements, such as an angle of arrival (AoA), based on the aggregated PRS.

At 808, the UE 100 transmits, to the LMF 112, information indicating the timing measurement and/or AoA of the one or more received positioning reference signals (PRS bins) of the second set of frequency hops (excluding the one or more missed PRS bins), the one or more channel characteristics of the one or more received positioning reference signals (PRS bins) of the second set of frequency hops, and the one or more identifiers of the one or more missed positioning reference signals of the second set of frequency hops (i.e., an identifier of each missed PRS bin). The UE 100 may transmit the information to the LMF 112 via a RAN node 104 (e.g., gNB). The LMF 112 receives the information. The LMF 112 may store or save the information in at least one memory.

The information may further indicate one or more time stamps associated with the one or more channel characteristics, and an identifier of each received PRS bin of the second set of frequency hops. In other words, the UE 100 may send the estimated one or more channel characteristics of each received PRS bin with a time stamp to the LMF 112.

At 809, the LMF 112 determines whether to replace the one or more missed PRS bins with previous PRS bins. For example, the LMF may compare the channel characteristics between the time occasions O(t) and O(t-n), or use a learning-based algorithm, such as an artificial intelligence or machine learning algorithm, to decide whether previous time instances of a given PRS bin could be utilized in case of a missed PRS bin. In this case, the LMF 112 determines to not replace the one or more missed PRS bins with previous PRS bins.

At 810, based on determining to not replace the one or more missed positioning reference signals (PRS bins), the LMF 112 transmits, to the UE 100, an indication indicating to prepare for a retransmission of the one or more missed positioning reference signals (PRS bins). In other words, the LMF 112 indicates its decision to not replace the one or more missed PRS bins with the one or more previous PRS bins to the UE 100. The LMF 112 may transmit the indication to the UE 100 via a RAN node 104 (e.g., gNB).

At 811, the LMF 112 transmits, to the at least one RAN node 104 (e.g., gNB), an indication indicating to retransmit the one or more missed positioning reference signals (PRS bins). The timing of the retransmission may be matched to the DRX cycle of the UE 100, so that the retransmission occurs during the ON-duration.

In other words, in this case, the one or more missed positioning reference signals may be compensated by transmitting the indication to the UE 100 to prepare for the retransmission of the one or more missed positioning reference signals, and having the at least one RAN node 104 retransmit the one or more missed positioning reference signals.

At 812, the at least one RAN node 104 (e.g., gNB) retransmits the one or more missed positioning reference signals (PRS bins) at occasion O(t+n) (i.e., at a later time compared to the transmission of the second set of frequency hops). The UE 100 receives, based on the indication of 810, the retransmission of the one or more missed positioning reference signals (PRS bins).

At 813, the UE 100 determines a measurement, such as a TOA estimate or a TDoA estimate, associated with the one or more received positioning reference signals (PRS bins) of the second set of frequency hops (from occasion O(t)) and the retransmission of the one or more missed positioning reference signals (PRS bins) (from occasion O(t+n)). In other words, the UE 100 may obtain the timing measurement by utilizing or aggregating the one or more received positioning reference signals (PRS bins) of the second set of frequency hops and the retransmission of the one or more missed positioning reference signals (PRS bins) (from occasion O(t+n)), resulting in a wide-band PRS. Alternatively, or additionally, the UE 100 may determine one or more other positioning-related measurements, such as an angle of arrival (AoA), based on the aggregated PRS.

At 814, the UE 100 transmits, or reports, to the LMF 112, the timing measurement and/or AoA associated with the one or more received positioning reference signals (PRS bins) of the second set of frequency hops and the retransmission of the one or more missed positioning reference signals (PRS bins). The UE 100 may transmit the timing measurement to the LMF 112 via a RAN node 104 (e.g., gNB). The LMF 112 receives the timing measurement from the UE 100.

At 815, the LMF 112 estimates a position (i.e., location) of the UE 100 based at least partly on the timing measurement (e.g., TOA estimate or TDoA estimate) and/or AoA associated with the one or more received positioning reference signals (PRS bins) of the second set of frequency hops and the retransmission of the one or more missed positioning reference signals (PRS bins) (from occasion O(t+n)). For example, the TOA estimate may be used to estimate a distance between the UE 100 and the at least one RAN node 104. The location of the at least one RAN node 104 may be known by the LMF 112, and thus the LMF may estimate the position of the UE 100 based on the distance between the UE 100 and the at least one RAN node 104.

For a two-dimensional position estimate of the UE 100, a TOA estimate of at least two RAN nodes (e.g., gNBs) may be needed. For three-dimensional positioning (x, y, z coordinates) of the UE 100, the LMF may need a TOA estimate of at least three RAN nodes (e.g., gNBs).

Figure 9:
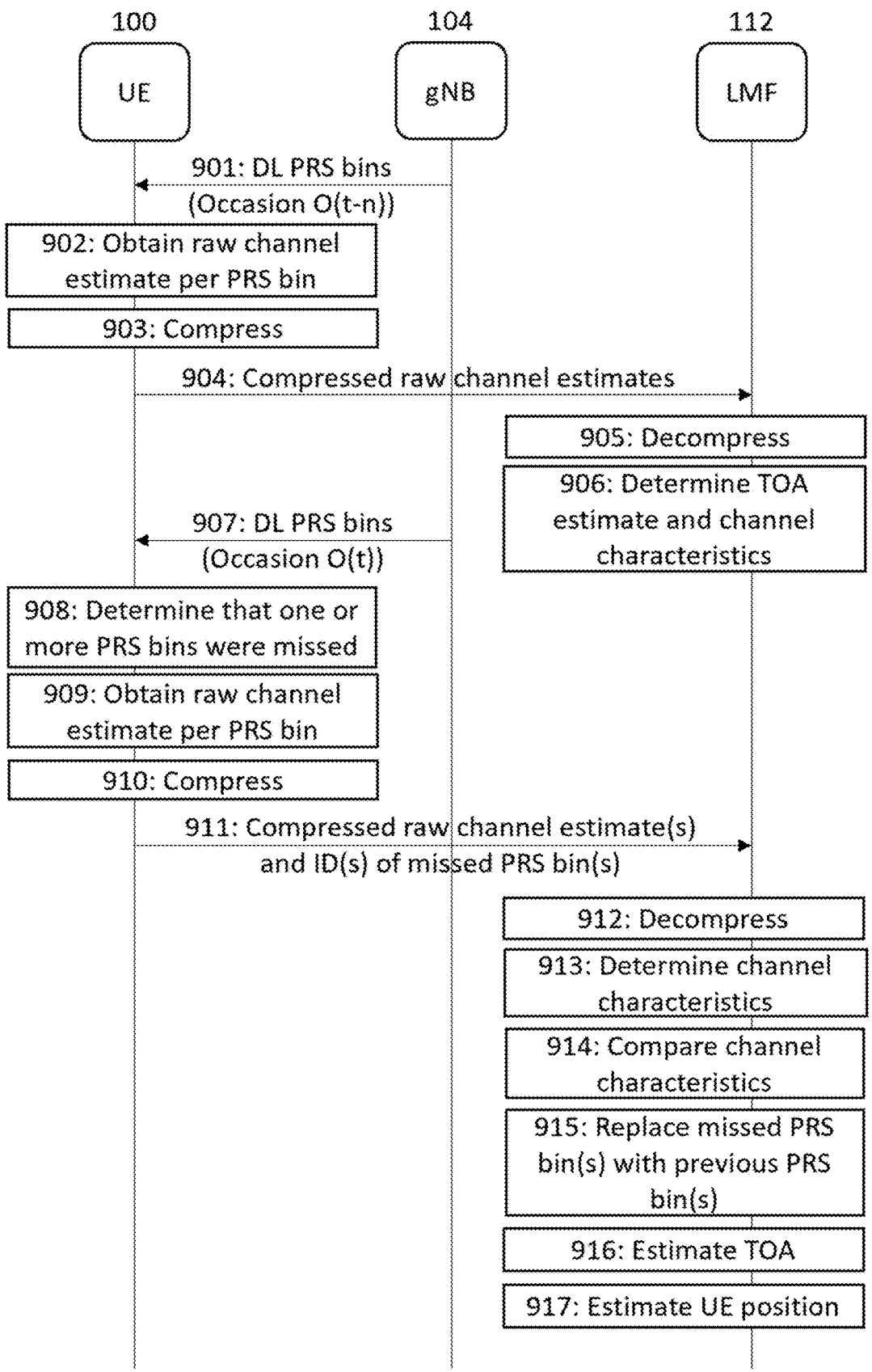
FIG. 9 illustrates a signal flow diagram.

FIG. 9 illustrates a signal flow diagram according to an example embodiment, wherein positioning measurement is performed using a frequency hopping configuration. In this example embodiment, the UE sends to the LMF the received signal that it gets (i.e., raw channel estimate), instead of or in addition to the PRS bin channel characteristics. In this approach, the UE may apply, for example, a compressive sensing technique to the raw channel estimate to reduce the payload size, and the LMF reconstructs, or decompresses, the signal (raw channel estimate) that the UE sends.

Referring to FIG. 9, at 901, at least one RAN node 104 (e.g., gNB) transmits a plurality of positioning reference signals of a first set of frequency hops at time occasion O(t-n). The positioning reference signals may also be referred to as PRS bins or frequency bins or frequency hops herein. The UE 100 receives the plurality of positioning reference signals (PRS bins) of the first set of frequency hops. In other words, in this case, the UE may not miss any PRS bins during positioning measurement for PRS using frequency hopping. The UE 100 may be a reduced capability (RedCap) device or any other type of UE.

At 902, the UE 100 obtains a raw channel estimate per positioning reference signal of the plurality of received positioning reference signals (PRS bins) of the first set of frequency hops. In other words, the UE 100 may obtain a raw channel estimate of each received PRS bin.

At 903, the UE 100 obtains a compressed raw channel estimate per positioning reference signal of the plurality of received positioning reference signals (PRS bin) of the first set of frequency hops by compressing the raw channel estimate. In other words, the UE 100 may compress the raw channel estimate of each received PRS bin of the first set of frequency hops.

For example, the raw channel estimate may be compressed with a compressive sensing technique. Alternatively, any other compression technique may be used.

At 904, the UE 100 transmits, to the LMF 112, the compressed raw channel estimates of the plurality of received positioning reference signals (PRS bins) of the first set of frequency hops. The UE 100 may transmit the compressed raw channel estimates to the LMF 112 via a RAN node 104 (e.g., gNB). The LMF 112 receives, from the UE 100, the compressed raw channel estimates of the plurality of received positioning reference signals (PRS bins) of the first set of frequency hops.

The compressed raw channel estimates indicate one or more channel characteristics of the plurality of received positioning reference signals, which the LMF 112 may determine after decompressing the compressed raw channel estimates.

At 905, the LMF 112 obtains a decompressed raw channel estimate per positioning reference signal of the plurality of positioning reference signals (PRS bins) of the first set of frequency hops by decompressing the compressed raw channel estimates.

The LMF 112 may store the decompressed raw channel estimates in at least one memory.

At 906, the LMF 112 determines, based on the decompressed raw channel estimates of the plurality of positioning reference signals (PRS bins) of the first set of frequency hops, a timing measurement, such as a TOA estimate or a TDoA estimate, and one or more channel characteristics of the plurality of positioning reference signals (PRS bins) of the first set of frequency hops. The LMF 112 may determine the timing measurement by utilizing or aggregating the plurality of positioning reference signals (i.e., all the received hops), resulting in a wide-band PRS. Alternatively, or additionally, the LMF may determine one or more other positioning-related measurements, such as an angle of arrival (AoA), based on the aggregated PRS.

For example, the one or more channel characteristics may comprise at least one of: a channel impulse response (CIR), a channel flatness probability (CFP), a reference signal received power (RSRP), a reference signal received quality (RSRQ), or a power delay profile (PDP) with a certain PDP-length (PDP-length to be configured by the LMF).

At 907, the at least one RAN node 104 (e.g., gNB) transmits a plurality of positioning reference signals (PRS bins) of a second set of frequency hops at time occasion O(t) (i.e., the second set of frequency hops is transmitted at a later time compared to the first set of frequency hops). The UE 100 receives one or more positioning reference signals (PRS bins) of the second set of frequency hops.

At 908, the UE 100 determines that one or more positioning reference signals (PRS bins) were missed in the second set of frequency hops, and the UE 100 determines one or more identifiers of the one or more missed positioning reference signals (i.e., an identifier of each missed PRS bin) of the second set of frequency hops. The UE may be pre-configured with a DL PRS configuration that indicates the PRS bins that the UE is supposed to receive, and thus the UE may determine the one or more missed positioning reference signals (PRS bins) based on the DL PRS configuration.

At 909, the UE 100 obtains a raw channel estimate of the one or more received positioning reference signals (PRS bins) of the second set of frequency hops. In other words, the UE 100 may obtain a raw channel estimate of each received PRS bin of the second set of frequency hops.

At 910, the UE 100 obtains a compressed raw channel estimate of the one or more received positioning reference signals (PRS bin) of the second set of frequency hops by compressing the raw channel estimate of the one or more received positioning reference signals (PRS bins) of the second set of frequency hops. In other words, the UE 100 may compress the raw channel estimate of each received PRS bin of the second set of frequency hops.

At 911, the UE 100 transmits, to the LMF 112, the compressed raw channel estimate of the one or more received positioning reference signals (PRS bins) of the second set of frequency hops, and the one or more identifiers of the one or more missed positioning reference signals (PRS bins) of the second set of frequency hops. The UE 100 may transmit the compressed raw channel estimate and the one or more identifiers to the LMF 112 via a RAN node 104 (e.g., gNB). The LMF 112 receives, from the UE 100, the compressed raw channel estimate of the one or more received positioning reference signals (PRS bins) of the second set of frequency hops, and the one or more identifiers of the one or more missed positioning reference signals. The LMF 112 may store the received information in at least one memory.

At 912, the LMF 112 obtains a decompressed raw channel estimate of each of the one or more positioning reference signals (PRS bins) of the second set of frequency hops by decompressing the compressed raw channel estimate of each of the one or more positioning reference signals (PRS bins) of the second set of frequency hops. The LMF 112 may store the decompressed raw channel estimate(s) in at least one memory.

At 913, the LMF 112 determines, based on the decompressed raw channel estimate of each of the one or more positioning reference signals (PRS bins) of the second set of frequency hops, one or more channel characteristics of each of the one or more positioning reference signals (PRS bins) of the second set of frequency hops.

At 914, the LMF 112 compares the channel characteristics of the correctly received PRS bins between the occasion O(t) and occasion O(t-n) with one or more pre-defined thresholds. If the comparison satisfies one or more pre-defined conditions, the LMF may use the one or more PRS bins received in an earlier DRX cycle (occasion O(t-n)) in place of the one or more missed PRS bins of occasion O(t).

For example, the LMF 112 may determine a similarity metric (e.g., a difference or a coherence time or a dynamic time warping index) between the one or more channel characteristics of the one or more received positioning reference signals (PRS bins) of the second set of frequency hops and one or more corresponding channel characteristics of one or more corresponding positioning reference signals (PRS bins) received in the first set of frequency hops (i.e., a previous set of frequency hops. The LMF 112 may then compare the similarity metric with the one or more pre-defined thresholds to determine whether to compensate for (e.g., replace) the one or more missed positioning reference signals by utilizing the one or more previous positioning reference signals from the first set of frequency hops.

Some further examples are described below with reference to FIG. 10.

At 915, upon determining to replace the one or more missed positioning reference signals based on the comparison, the LMF 112 replaces the one or more missed positioning reference signals of the second set of frequency hops with the one or more previous positioning reference signals from the first set of frequency hops by using the decompressed raw channel estimate of the one or more previous positioning reference signals (obtained at 905).

At 916, the LMF 112 determines, based on the replacement, a timing measurement, such as a TOA estimate or a TDoA estimate, associated with the one or more received positioning reference signals of the second set of frequency hops and the one or more previous positioning reference signals from the first set of frequency hops. The LMF 112 may obtain the timing measurement by utilizing or aggregating the one or more received positioning reference signals (PRS bins) of the second set of frequency hops and the one or more previous positioning reference signals (PRS bins) of the first set of frequency hops, resulting in a wide-band PRS. Alternatively, or additionally, the LMF may determine one or more other positioning-related measurements, such as an angle of arrival (AoA), based on the aggregated PRS.

At 917, the LMF 112 estimates a position (i.e., location) of the UE 100 based at least partly on the timing measurement (e.g., TOA estimate or TDoA estimate) and/or AoA associated with the one or more received positioning reference signals (PRS bins) of the second set of frequency hops and the one or more previous positioning reference signals (PRS bins) from the first set of frequency hops. For example, the TOA estimate may be used to estimate a distance between the UE 100 and the at least one RAN node 104. The location of the at least one RAN node 104 may be known by the LMF 112, and thus the LMF may estimate the position of the UE 100 based on the distance between the UE 100 and the at least one RAN node 104.

For a two-dimensional position estimate of the UE 100, a TOA estimate of at least two RAN nodes (e.g., gNBs) may be needed. For three-dimensional positioning (x, y, z coordinates) of the UE 100, the LMF may need a TOA estimate of at least three RAN nodes (e.g., gNBs).

It should be noted that the example embodiments are not limited to downlink positioning scenarios, and they may also be applied to sidelink positioning scenarios. For example, in FIGS. 7, 8 and 9, the gNB 104 may be replaced by another UE 102, which may transmit SL PRS bins received by the UE 100.

Figure 10:
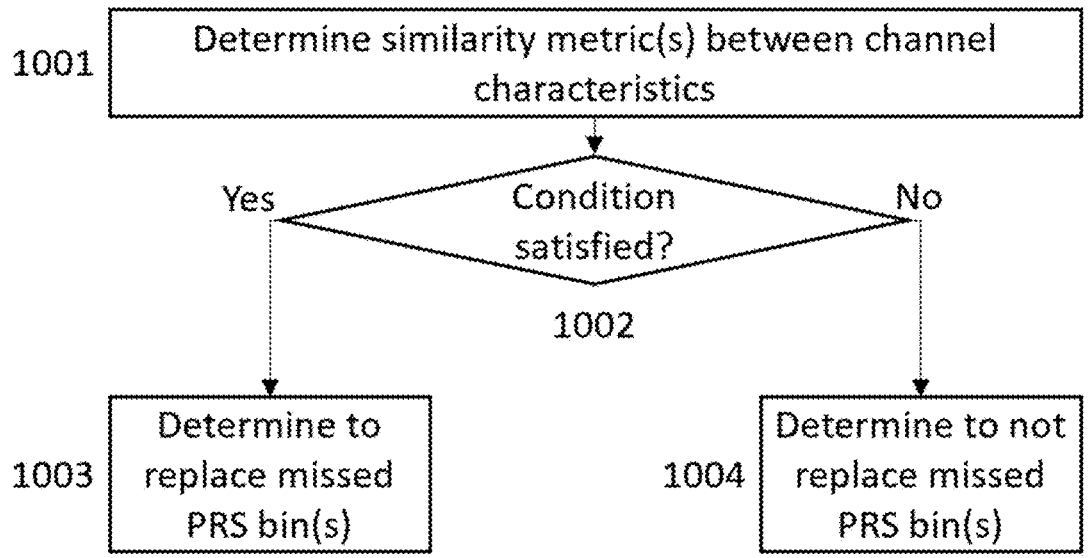
FIG. 10 illustrates a flow chart.

FIG. 10 illustrates a flow chart according to an example embodiment of a method performed by an apparatus 1400, such as a location server, or a location management function 112 of a core network 110, or any other location management entity.

In this example embodiment, the decision-making entity (e.g., LMF) may consider one or more channel characteristics (defined for each received PRS bin and time stamp) as input parameters for the decision of whether to replace the one or more missed PRS bins (e.g., at 709 of FIG. 7, or at 809 of FIG. 8, or at 914 of FIG. 9).

In block 1001, the LMF determines one or more similarity metrics between one or more channel characteristics of one or more received positioning reference signals (from occasion O(t) and one or more corresponding channel characteristics of one or more corresponding positioning reference signals received in one or more previous sets of frequency hops (from occasion O(t-n)).

For example, the one or more channel characteristics may comprise at least one of: a channel impulse response (CIR), a channel flatness probability (CFP), a reference signal received power (RSRP), a reference signal received quality (RSRQ), or a power delay profile (PDP) with a certain PDP-length (PDP-length to be configured by the LMF).

The one or more similarity metrics may comprise at least one of: a difference between the one or more channel characteristics of the one or more received positioning reference signals and the one or more corresponding channel characteristics of the one or more corresponding positioning reference signals received in the one or more previous sets of frequency hops, a coherence time between the one or more received positioning reference signals and one or more corresponding positioning reference signals from the one or more previous sets of frequency hops, or a dynamic time warping index between the one or more received positioning reference signals and one or more corresponding positioning reference signals from the one or more previous sets of frequency hops.

The coherence time (CT) and/or the dynamic time warping (DTW) index may be used as additional similarity metrics to identify the correlation factors (to check if there is a significant change in channel characteristics) between the current frequency hopping occasion O(t) and one or more previous occasions O(t-n).

Coherence time is a term used in wireless communications to describe the time duration over which a wireless channel can be considered "constant" or "stable." Wireless channels are subject to various phenomena like multipath propagation, fading, and Doppler shifts due to the mobility of the transmitter, receiver, or surrounding objects. These factors may cause the channel properties to vary over time. However, for a given time period, if these variations are minor, the channel can be considered "coherent" or "constant." This period is referred to as the coherence time of the channel.

DTW is an algorithm for measuring the similarity between two temporal sequences. In general, it may be used to calculate an optimal match between two given sequences. Herein it may be used to measure similarities between, for example, PDPs in occasions O(t) and O(t-n). Then the DTW (e.g., of the PDPs at occasions O(t) and O(t-n)) may be compared with respect to a given threshold.

In block 1002, the LMF compares the one or more similarity metrics with one or more pre-defined thresholds to determine whether to compensate for (e.g., replace) the one or more missed positioning reference signals by utilizing the one or more previous positioning reference signals from the one or more previous sets of frequency hops. This decision may depend on one or more conditions.

As an example, the one or more conditions may require that the difference in the CFP of a given PRS bin between time occasions O(t) and O(t-n) is below or equal to a pre-defined threshold $CFP_{th}$:

$$|CFP(bin\_id\_n, O(t-n)) - CFP(bin\_id\_n, O(t))| \leq CFP_{th}$$

Alternatively, or additionally, the one or more conditions may require that the difference in the RSRP of a given PRS bin between time occasions O(t) and O(t-n) is below or equal to a pre-defined threshold $RSRP_{th}$:

$$|RSRP(bin\_id\_n, O(t-n)) - RSRP(bin\_id\_n, O(t))| \leq RSRP_{th}$$

Alternatively, or additionally, the one or more conditions may require that the coherence time between the one or more received positioning reference signals of occasion O(t) and one or more corresponding positioning reference signals received in occasion O(t-n) is above or equal to a time duration over which the one or more received positioning reference signals of occasion O(t) and the one or more corresponding positioning reference signals of occasion O(t-n) were measured:

$$|CT(bin\_id\_n, O(t-n) - O(t)| \geq O(t) - O(t-n)$$

Alternatively, or additionally, the one or more conditions may require that the dynamic time warping index between the one or more received positioning reference signals of occasion O(t) and one or more corresponding positioning reference signals from the one or more previous sets of frequency hops of occasion O(t-n) is above or equal to a pre-defined threshold $DTW_{th}$:

$$DTW(bin\_id\_n, O(t-n) - O(t)) \geq DTW_{th}$$

The CFP, RSRP, CT, and/or DTW may be compared for each received PRS bin ID, or for an average of all PRS bin IDs of a given set of frequency hops.

For example, at least one of the above conditions may need to be satisfied in order to replace the one or more missed PRS bins. As another example, a majority of the above conditions may need to be satisfied in order to replace the one or more missed PRS bins. As another example, all of the above conditions may need to be satisfied in order to replace the one or more missed PRS bins.

In block 1003, if the one or more conditions are satisfied (block 1002: yes), then the LMF determines to replace the one or more missed PRS bins with the one or more previous PRS bins. The one or more missed PRS bins may be replaced at the UE (as described above with reference to FIG. 7), or at the LMF (as described above with reference to FIG. 9).

Alternatively, in block 1004, if the one or more conditions are not satisfied (block 1002: no), then the LMF determines to not replace the one or more missed PRS bins with the one or more previous PRS bins. In this case, the LMF may prepare or configure the at least one RAN node and the UE for a retransmission of the one or more missed PRS bins, as explained above with reference to FIG. 8.

Figure 11:
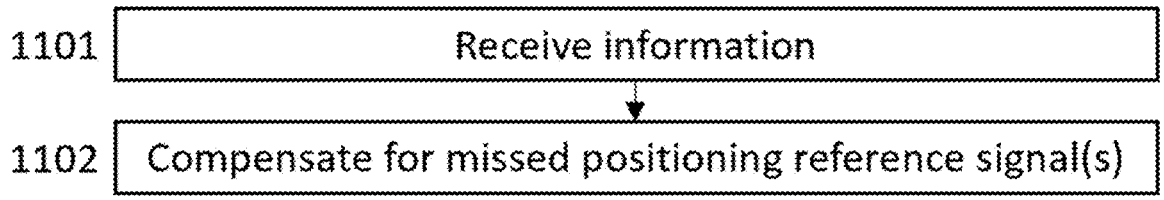
FIG. 11 illustrates a flow chart.

FIG. 11 illustrates a flow chart according to an example embodiment of a method performed by an apparatus 1400, such as a location server, or a location management function 112 of a core network 110, or any other location management entity.

Referring to FIG. 11, in block 1101, the apparatus 1400 (or LMF 112) receives, from a user equipment 100, information indicating at least: one or more channel characteristics of one or more received positioning reference signals 632, 633, 634 of a set of frequency hops 630, and one or more identifiers of one or more missed positioning reference signals of the set of frequency hops 630. The user equipment 100 may be a reduced capability (RedCap) device or any other type of UE.

Herein the expression "one or more received positioning reference signals" mean that the one or more positioning reference signals (PRS bins) were received by the user equipment 100. The one or more received positioning reference signals may also be referred to as one or more non-missed positioning reference signals (or non-missed PRS bins). Herein the positioning reference signals may refer to downlink positioning reference signals or sidelink positioning reference signals.

The one or more missed positioning reference signals (PRS bins) refer to positioning reference signals (PRS bins) that were transmitted by one or more network nodes 104 but failed to be received or detected by the user equipment 100.

In block 1102, the apparatus 1400 (or LMF 112) compensates for the one or more missed positioning reference signals of the set of frequency hops 630 based at least partly on the information.

The one or more channel characteristics may comprise at least one of: a channel impulse response, a channel flatness probability, a reference signal received power, a reference signal received quality, or a power delay profile.

The information received from the user equipment 100 may comprise the one or more channel characteristics as determined by the user equipment 100.

Alternatively, the information received from the user equipment 100 may comprise a compressed raw channel estimate of the one or more received positioning reference signals 632, 633, 634. In this case, the apparatus 1400 (or LMF 112) may obtain a decompressed raw channel estimate of the one or more received positioning reference signals 632, 633, 634 by decompressing the compressed raw channel estimate; and determine the one or more channel characteristics based on the decompressed raw channel estimate.

The one or more missed positioning reference signals may be compensated by utilizing one or more previous positioning reference signals 611, 625 from one or more previous sets of frequency hops 610, 620, based at least on the one or more channel characteristics of the one or more received positioning reference signals 632, 633, 634 and one or more corresponding channel characteristics of one or more corresponding positioning reference signals 612, 613, 614, 622, 623, 624 received (by the user equipment 100) in the one or more previous sets of frequency hops 610, 620.

The apparatus 1400 (or LMF 112) may determine a similarity metric (e.g., a difference or a coherence time or a dynamic time warping index) between the one or more channel characteristics of the one or more received positioning reference signals 632, 633, 634 and the one or more corresponding channel characteristics of the one or more corresponding positioning reference signals 612, 613, 614, 622, 623, 624 received in the one or more previous sets of frequency hops 610, 620; compare the similarity metric with one or more pre-defined thresholds; and determine, based at least on the comparison (e.g., as described above with reference to FIG. 10), whether to compensate for the one or more missed positioning reference signals by utilizing the one or more previous positioning reference signals 611, 625 from the one or more previous sets of frequency hops 610, 620.

For example, the apparatus 1400 (or LMF 112) may determine a difference between the one or more channel characteristics (e.g., CIR, CFP, RSRP, RSRQ, and/or PDP) of the one or more received positioning reference signals 632, 633, 634, and one or more corresponding channel characteristics of one or more corresponding positioning reference signals 612, 613, 614, 622, 623, 624 from the one or more previous sets of frequency hops 610, 620; and compare the difference with one or more pre-defined thresholds, wherein the one or more missed positioning reference signals may be compensated by utilizing the one or more previous positioning reference signals 611, 625, based at least on the difference being below or equal to the one or more pre-defined thresholds.

As another example, the apparatus 1400 (or LMF 112) may determine a coherence time between the one or more received positioning reference signals 632, 633, 634 and one or more corresponding positioning reference signals 612, 613, 614, 622, 623, 624 from the one or more previous sets of frequency hops 610, 620; and compare the coherence time with a time duration over which the one or more received positioning reference signals 632, 633, 634 and the one or more corresponding positioning reference signals 612, 613, 614, 622, 623, 624 from the one or more previous sets of frequency hops 610, 620 were measured, wherein the one or more missed positioning reference signals may be compensated by utilizing the one or more previous positioning reference signals 611, 625, based at least on the coherence time being above or equal to the time duration.

As another example, the apparatus 1400 (or LMF 112) may determine a dynamic time warping index between the one or more received positioning reference signals 632, 633, 634 and one or more corresponding positioning reference signals 612, 613, 614, 622, 623, 624 from the one or more previous sets of frequency hops 610, 620; and compare the dynamic time warping index with a pre-defined threshold, wherein the one or more missed positioning reference signals may be compensated by utilizing the one or more previous positioning reference signals 611, 625, based at least on the dynamic time warping index being above or equal to the pre-defined threshold.

The apparatus 1400 (or LMF 112) may estimate a position of the user equipment 100 based on a timing measurement (e.g., a time of arrival estimate) associated with the one or more received positioning reference signals 632, 633, 634 and the one or more previous positioning reference signals 611, 625 from the one or more previous sets of frequency hops 610, 620.

The apparatus 1400 (or LMF 112) may transmit, to the user equipment 100, an indication indicating to replace the one or more missed positioning reference signals with the one or more previous positioning reference signals 611, 625 from the one or more previous sets of frequency hops 610, 620; and receive, from the user equipment 100, based on transmitting the indication, the timing measurement associated with the one or more received positioning reference signals 632, 633, 634 and the one or more previous positioning reference signals 611, 625.

Alternatively, the apparatus 1400 (or LMF 112) may receive, from the user equipment 100, a compressed raw channel estimate of the one or more previous positioning reference signals 611, 625 from the one or more previous sets of frequency hops 610, 620; obtain a decompressed raw channel estimate of the one or more previous positioning reference signals 611, 625 by decompressing the compressed raw channel estimate of the one or more previous positioning reference signals 611, 625; replace the one or more missed positioning reference signals with the one or more previous positioning reference signals 611, 625 by using the decompressed raw channel estimate of the one or more previous positioning reference signals 611, 625; and determine, based on the replacement, the timing measurement associated with the one or more received positioning reference signals 632, 633, 634 and the one or more previous positioning reference signals 611, 625.

Alternatively, the one or more missed positioning reference signals may be compensated by transmitting, to the user equipment 100, an indication indicating to prepare for a retransmission of the one or more missed positioning reference signals; and receiving, from the user equipment, based on transmitting the indication, a timing measurement associated with the one or more received positioning reference signals 632, 633, 634 and the retransmission of the one or more missed positioning reference signals.

Figure 12:
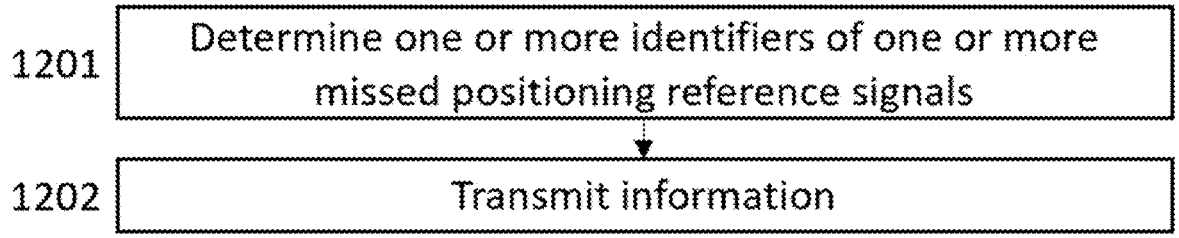
FIG. 12 illustrates a flow chart.

FIG. 12 illustrates a flow chart according to an example embodiment of a method performed by an apparatus 1300. For example, the apparatus 1300 may be, or comprise, or be comprised in, a user equipment (UE) 100, 102. The user equipment may be a reduced capability (RedCap) device or any other type of UE.

Referring to FIG. 12, in block 1201, the apparatus 1300 determines one or more identifiers of one or more missed positioning reference signals of a set of frequency hops 630.

The one or more missed positioning reference signals (PRS bins) refer to positioning reference signals (PRS bins) that were transmitted by one or more network nodes 104 but failed to be received or detected by the apparatus 1300.

In block 1202, the apparatus 1300 transmits, to a location management entity (e.g., LMF 112 or another location server), information indicating at least: one or more channel characteristics of one or more received positioning reference signals 632, 633, 634 of the set of frequency hops 630, and the one or more identifiers of the one or more missed positioning reference signals of the set of frequency hops 630.

The one or more received positioning reference signals 632, 633, 634 may also be referred to as one or more non-missed positioning reference signals (or non-missed PRS bins). Herein the positioning reference signals may refer to downlink positioning reference signals or sidelink positioning reference signals.

The apparatus 1300 may determine, based on a raw channel estimate of the one or more received positioning reference signals 632, 633, 634, the one or more channel characteristics of the one or more received positioning reference signals 632, 633, 634 of the set of frequency hops 630. In this case, the information transmitted to the location management entity may comprise the one or more channel characteristics determined by the apparatus 1300 (e.g., UE 100).

Alternatively, the apparatus 1300 may obtain a compressed raw channel estimate of the one or more received positioning reference signals 632, 633, 634 by compressing a raw channel estimate of the one or more received positioning reference signals 632, 633, 634. In this case, the information transmitted to the location management entity may comprise the compressed raw channel estimate, the compressed raw channel estimate indicating the one or more channel characteristics of the one or more received positioning reference signals 632, 633, 634.

The apparatus 1300 may transmit, to the location management entity, information associated with one or more positioning reference signals 611, 612, 613, 614, 622, 623, 624, 625 from one or more previous sets of frequency hops 610, 620, the information indicating at least one or more channel characteristics of the one or more positioning reference signals 611, 612, 613, 614, 622, 623, 624, 625 from the one or more previous sets of frequency hops 610, 620.

The apparatus 1300 may receive, from the location management entity, an indication indicating to replace the one or more missed positioning reference signals with one or more previous positioning reference signals 611, 625 from the one or more previous sets of frequency hops 610, 620; replace, based on the indication, the one or more missed positioning reference signals with the one or more previous positioning reference signals 611, 625 by using a raw channel estimate of the one or more previous positioning reference signals 611, 625; determine, based on the replacement, a timing measurement associated with the one or more received positioning reference signals 632, 633, 634 and the one or more previous positioning reference signals 611, 625; and transmit, to the location management entity, the timing measurement associated with the one or more received positioning reference signals 632, 633, 634 and the one or more previous positioning reference signals 611, 625.

Alternatively, the apparatus 1300 may receive, from the location management entity, an indication indicating to prepare for a retransmission of the one or more missed positioning reference signals; receive, based on the indication, the retransmission of the one or more missed positioning reference signals (e.g., from at least one network node 104 such as a gNB); determine a timing measurement associated with the one or more received positioning reference signals 632, 633, 634 and the retransmission of the one or more missed positioning reference signals; and transmit, to the location management entity, the timing measurement associated with the one or more received positioning reference signals 632, 633, 634 and the retransmission of the one or more missed positioning reference signals.

The blocks, related functions, and information exchanges (messages) described above by means of FIGS. 7-12 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 13:
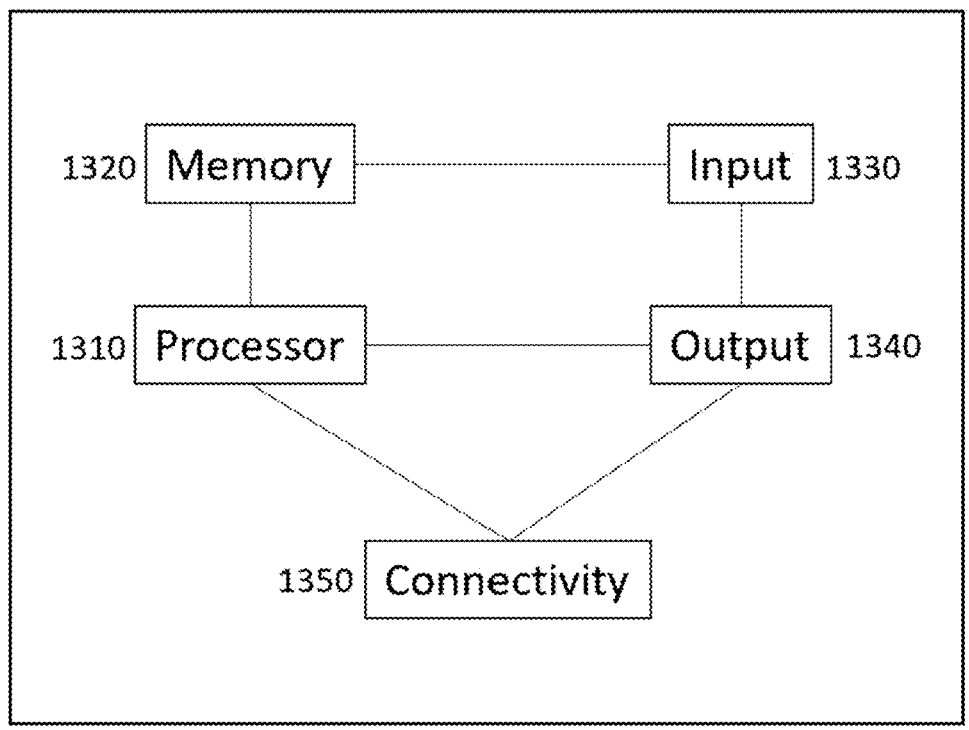
FIG. 13 illustrates an example of an apparatus.

FIG. 13 illustrates an example of an apparatus 1300 comprising means for performing one or more of the example embodiments described above. For example, the apparatus 1300 may be an apparatus such as, or comprising, or comprised in, a user equipment (UE) 100, 102. The user equipment may be a reduced capability (RedCap) device or any other type of UE. The user equipment may also be called a wireless communication device, a subscriber unit, a mobile station, a remote terminal, an access terminal, a user terminal, a terminal device, or a user device.

The apparatus 1300 may comprise a circuitry or a chipset applicable for realizing one or more of the example embodiments described above. For example, the apparatus 1300 may comprise at least one processor 1310. The at least one processor 1310 interprets instructions (e.g., computer program instructions) and processes data. The at least one processor 1310 may comprise one or more programmable processors. The at least one processor 1310 may comprise programmable hardware with embedded firmware and may, alternatively or additionally, comprise one or more application-specific integrated circuits (ASICs).

The at least one processor 1310 is coupled to at least one memory 1320. The at least one processor is configured to read and write data to and from the at least one memory 1320. The at least one memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The at least one memory 1320 stores computer readable instructions that are executed by the at least one processor 1310 to perform one or more of the example embodiments described above. For example, non-volatile memory stores the computer readable instructions, and the at least one processor 1310 executes the instructions using volatile memory for temporary storage of data and/or instructions. The computer readable instructions may refer to computer program code.

The computer readable instructions may have been pre-stored to the at least one memory 1320 or, alternatively or additionally, they may be received, by the apparatus, via an electromagnetic carrier signal and/or may be copied from a physical entity such as a computer program product. Execution of the computer readable instructions by the at least one processor 1310 causes the apparatus 1300 to perform one or more of the example embodiments described above. That is, the at least one processor and the at least one memory storing the instructions may provide the means for providing or causing the performance of any of the methods and/or blocks described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer. The term "non-transitory," as used herein, is a limitation of the medium itself (i.e., tangible, not a signal) as opposed to a limitation on data storage persistency (e.g., RAM vs. ROM).

The apparatus 1300 may further comprise, or be connected to, an input unit 1330. The input unit 1330 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1330 may comprise an interface to which external devices may connect to.

The apparatus 1300 may also comprise an output unit 1340. The output unit may comprise or be connected to one or more displays capable of rendering visual content, such as a light emitting diode (LED) display, a liquid crystal display (LCD) and/or a liquid crystal on silicon (LCoS) display. The output unit 1340 may further comprise one or more audio outputs. The one or more audio outputs may be for example loudspeakers.

The apparatus 1300 further comprises a connectivity unit 1350. The connectivity unit 1350 enables wireless connectivity to one or more external devices. The connectivity unit 1350 comprises at least one transmitter and at least one receiver that may be integrated to the apparatus 1300 or that the apparatus 1300 may be connected to. The at least one transmitter comprises at least one transmission antenna, and the at least one receiver comprises at least one receiving antenna. The connectivity unit 1350 may comprise an integrated circuit or a set of integrated circuits that provide the wireless communication capability for the apparatus 1300. Alternatively, the wireless connectivity may be a hardwired application-specific integrated circuit (ASIC). The connectivity unit 1350 may also provide means for performing at least some of the blocks or functions of one or more example embodiments described above. The connectivity unit 1350 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

It is to be noted that the apparatus 1300 may further comprise various components not illustrated in FIG. 13. The various components may be hardware components and/or software components.

Figure 14:
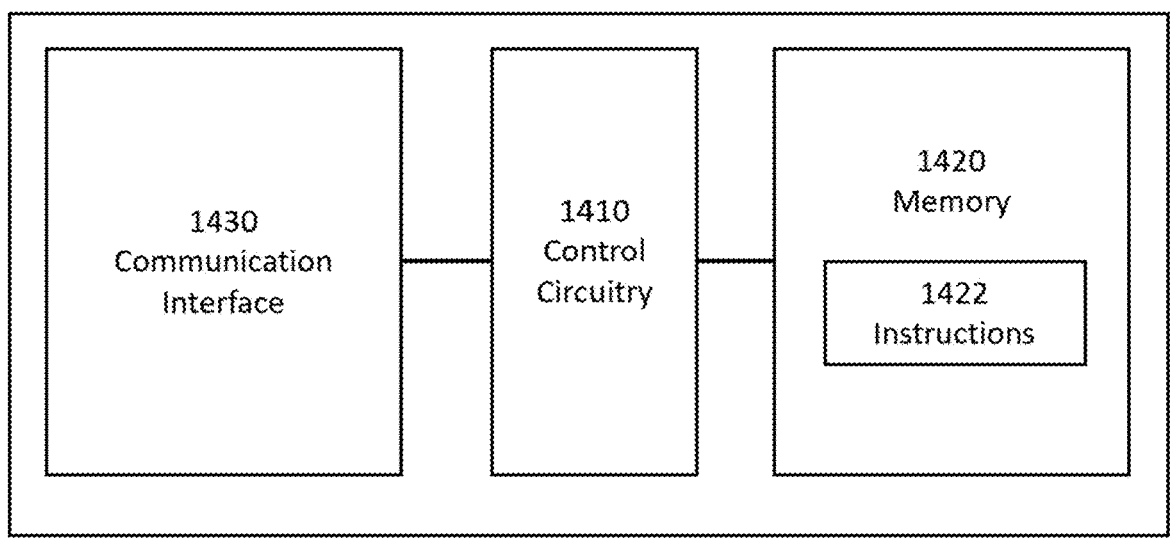
FIG. 14 illustrates an example of an apparatus.

FIG. 14 illustrates an example of an apparatus 1400 comprising means for performing one or more of the example embodiments described above. For example, the means may be a location management function (LMF) 112 of the core network 110 or the means may be network function virtualization infrastructure.

The apparatus 1400 may comprise, for example, a circuitry or a chipset applicable for realizing one or more of the example embodiments described above. The apparatus 1400 may be an electronic device or computing system comprising one or more electronic circuitries. The apparatus 1400 may comprise a control circuitry 1410 such as at least one processor, and at least one memory 1420 storing instructions 1422 which, when executed by the at least one processor, cause the apparatus 1400 to carry out one or more of the example embodiments described above. Such instructions 1422 may, for example, include computer program code (software). The at least one processor and the at least one memory storing the instructions may provide the means for providing or causing the performance of any of the methods and/or blocks described above.

The processor is coupled to the memory 1420. The processor is configured to read and write data to and from the memory 1420. The memory 1420 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1420 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 1420 or, alternatively or additionally, they may be received, by the apparatus, via an electromagnetic carrier signal and/or may be copied from a physical entity such as a computer program product. Execution of the computer readable instructions causes the apparatus 1400 to perform one or more of the functionalities described above.

The memory 1420 may be implemented using any suitable data storage technology, such as semiconductor-based memory devices, flash memory, magnetic memory devices and systems, optical memory devices and systems, fixed memory and/or removable memory.

The apparatus 1400 may further comprise or be connected to a communication interface 1430 comprising hardware and/or software for realizing communication connectivity according to one or more communication protocols. The communication interface 1430 may comprise at least one transmitter (Tx) and at least one receiver (Rx) that may be integrated to the apparatus 1400 or that the apparatus 1400 may be connected to. The communication interface 1430 may provide means for performing some of the blocks for one or more example embodiments described above. The communication interface 1430 may comprise one or more components, such as: power amplifier, digital front end (DFE), analog-to-digital converter (ADC), digital-to-analog converter (DAC), frequency converter, (de) modulator, and/or encoder/decoder circuitries, controlled by the corresponding controlling units.

The communication interface 1430 provides the apparatus with communication capabilities to communicate in the wireless communication network. The communication interface 1430 may, for example, provide a radio, cable or fiber interface to an AMF 111 and/or one or more network nodes 104 of a radio access network. Alternatively, or additionally, the communication interface 1430 may provide a radio interface to one or more UEs 100, 102.

It is to be noted that the apparatus 1400 may further comprise various components not illustrated in FIG. 14. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
   receive, from a user equipment, information indicating at least:
one or more channel characteristics of one or more received positioning reference signals of a set of frequency hops, and
   one or more identifiers of one or more missed positioning reference signals of the set of frequency hops; and
   compensate for the one or more missed positioning reference signals of the set of frequency hops based at least partly on the information.

2. The apparatus according to claim 1, wherein the one or more channel characteristics comprise at least one of:
   a channel impulse response,
   a channel flatness probability,
   a reference signal received power,
   a reference signal received quality, or
   a power delay profile.

3. The apparatus according to claim 1, wherein the information received from the user equipment comprises a compressed raw channel estimate of the one or more received positioning reference signals;
   wherein the apparatus is further caused to:
   obtain a decompressed raw channel estimate of the one or more received positioning reference signals by decompressing the compressed raw channel estimate; and
   determine the one or more channel characteristics based on the decompressed raw channel estimate.

4. The apparatus according to claim 1, wherein the one or more missed positioning reference signals are compensated by utilizing one or more previous positioning reference signals from one or more previous sets of frequency hops, based at least on the one or more channel characteristics of the one or more received positioning reference signals and one or more corresponding channel characteristics of one or more corresponding positioning reference signals received in the one or more previous sets of frequency hops.

5. The apparatus according to claim 4, further being caused to:
   determine a similarity metric between the one or more channel characteristics of the one or more received positioning reference signals and the one or more corresponding channel characteristics of the one or more corresponding positioning reference signals received in the one or more previous sets of frequency hops;
   compare the similarity metric with one or more pre-defined thresholds; and
   determine, based at least on the comparison, whether to compensate for the one or more missed positioning reference signals by utilizing the one or more previous positioning reference signals from the one or more previous sets of frequency hops.

6. The apparatus according to claim 4, further being caused to:
   determine a coherence time between the one or more received positioning reference signals and one or more corresponding positioning reference signals from the one or more previous sets of frequency hops; and
   compare the coherence time with a time duration over which the one or more received positioning reference signals and the one or more corresponding positioning reference signals from the one or more previous sets of frequency hops were measured,
   wherein the one or more missed positioning reference signals are compensated by utilizing the one or more previous positioning reference signals, based at least on the coherence time being above or equal to the time duration.

7. The apparatus according to claim 4, further being caused to:
   determine a dynamic time warping index between the one or more received positioning reference signals and one or more corresponding positioning reference signals from the one or more previous sets of frequency hops; and
   compare the dynamic time warping index with a pre-defined threshold,
   wherein the one or more missed positioning reference signals are compensated by utilizing the one or more previous positioning reference signals, based at least on the dynamic time warping index being above or equal to the pre-defined threshold.

8. The apparatus according to claim 4, further being caused to:
   estimate a position of the user equipment based at least partly on a timing measurement associated with the one or more received positioning reference signals and the one or more previous positioning reference signals from the one or more previous sets of frequency hops.

9. The apparatus according to claim 8, further being caused to:
   transmit, to the user equipment, an indication indicating to replace the one or more missed positioning reference signals with the one or more previous positioning reference signals from the one or more previous sets of frequency hops; and
   receive, from the user equipment, based on transmitting the indication, the timing measurement associated with the one or more received positioning reference signals and the one or more previous positioning reference signals.

10. The apparatus according to claim 8, further being caused to:
    receive, from the user equipment, a compressed raw channel estimate of the one or more previous positioning reference signals from the one or more previous sets of frequency hops;
    obtain a decompressed raw channel estimate of the one or more previous positioning reference signals by decompressing the compressed raw channel estimate of the one or more previous positioning reference signals;
    replace the one or more missed positioning reference signals with the one or more previous positioning reference signals by using the decompressed raw channel estimate of the one or more previous positioning reference signals; and
    determine, based on the replacement, the timing measurement associated with the one or more received positioning reference signals and the one or more previous positioning reference signals.

11. The apparatus according to claim 1, further being caused to:
- transmit, to the user equipment, an indication indicating to prepare for a retransmission of the one or more missed positioning reference signals,
- wherein the one or more missed positioning reference signals are compensated by transmitting the indication; and
- receive, from the user equipment, based on transmitting the indication, a timing measurement associated with the one or more received positioning reference signals and the retransmission of the one or more missed positioning reference signals.

12. An apparatus comprising at least one processor, and at least one memory storing instructions that, when executed by the at least one processor, cause the apparatus at least to:
- determine one or more identifiers of one or more missed positioning reference signals of a set of frequency hops; and
- transmit, to a location management entity, information indicating at least:
one or more channel characteristics of one or more received positioning reference signals of the set of frequency hops, and
- the one or more identifiers of the one or more missed positioning reference signals of the set of frequency hops.

13. The apparatus according to claim 12, further being caused to:
- determine, based on a raw channel estimate of the one or more received positioning reference signals, the one or more channel characteristics of the one or more received positioning reference signals of the set of frequency hops.

14. The apparatus according to claim 12, further being caused to:
- obtain a compressed raw channel estimate of the one or more received positioning reference signals by compressing a raw channel estimate of the one or more received positioning reference signals,
- wherein the information transmitted to the location management entity comprises the compressed raw channel estimate, the compressed raw channel estimate indicating the one or more channel characteristics of the one or more received positioning reference signals.

15. The apparatus according to claim 12, further being caused to:
- transmit, to the location management entity, information associated with one or more positioning reference signals from one or more previous sets of frequency hops, the information indicating at least one or more channel characteristics of the one or more positioning reference signals from the one or more previous sets of frequency hops.

16. The apparatus according to claim 15, further being caused to:
- receive, from the location management entity, an indication indicating to replace the one or more missed positioning reference signals with one or more previous positioning reference signals from the one or more previous sets of frequency hops;
- replace, based on the indication, the one or more missed positioning reference signals with the one or more previous positioning reference signals by using a raw channel estimate of the one or more previous positioning reference signals;
- determine, based on the replacement, a timing measurement associated with the one or more received positioning reference signals and the one or more previous positioning reference signals; and
- transmit, to the location management entity, the timing measurement associated with the one or more received positioning reference signals and the one or more previous positioning reference signals.

17. The apparatus according to claim 12, further being caused to:
- receive, from the location management entity, an indication indicating to prepare for a retransmission of the one or more missed positioning reference signals;
receive, based on the indication, the retransmission of the one or more missed positioning reference signals;
- determine a timing measurement associated with the one or more received positioning reference signals and the retransmission of the one or more missed positioning reference signals; and
- transmit, to the location management entity, the timing measurement associated with the one or more received positioning reference signals and the retransmission of the one or more missed positioning reference signals.

18. A method comprising:
receiving, from a user equipment, information indicating at least:
one or more channel characteristics of one or more received positioning reference signals of a set of frequency hops, and
one or more identifiers of one or more missed positioning reference signals of the set of frequency hops; and
compensating for the one or more missed positioning reference signals of the set of frequency hops based at least partly on the information.

* * * * *